(12) United States Patent
Wang et al.

(10) Patent No.: US 10,994,694 B2
(45) Date of Patent: May 4, 2021

(54) WEBBING HEIGHT ADJUSTMENT DEVICE

(71) Applicant: Liang Hsiung Wang, Tainan (TW)

(72) Inventors: Liang Hsiung Wang, Tainan (TW); Chia-Chun Chu, Tainan (TW)

(73) Assignee: Liang Hsiung Wang, Tainan (TW)

( * ) Notice: Subject to any disclaimer, the term of this patent is extended or adjusted under 35 U.S.C. 154(b) by 147 days.

(21) Appl. No.: 16/454,274

(22) Filed: Jun. 27, 2019

(65) Prior Publication Data

US 2020/0017065 A1 Jan. 16, 2020

(30) Foreign Application Priority Data

Jul. 12, 2018 (TW) .................................. 10712405.9

(51) Int. Cl.
*B60R 22/24* (2006.01)
*B60R 22/20* (2006.01)
*B60R 22/02* (2006.01)

(52) U.S. Cl.
CPC .......... *B60R 22/201* (2013.01); *B60R 22/024* (2013.01)

(58) Field of Classification Search
CPC ..... B60R 22/206; B60R 22/201; B60R 22/20; B60R 22/24; B60R 2022/1818
See application file for complete search history.

(56) References Cited

U.S. PATENT DOCUMENTS

| | | | | |
|---|---|---|---|---|
| 1,049,732 A * | 1/1913 | Kerngood | ............... | A44B 11/10 24/194 |
| 2,317,571 A * | 4/1943 | White | ..................... | A44B 11/04 24/171 |
| 3,293,713 A * | 12/1966 | Gaylord | ................. | A44B 11/10 24/196 |
| 4,834,427 A * | 5/1989 | Takada | .................. | B60R 22/203 280/801.2 |
| 8,308,244 B2 * | 11/2012 | Parker | ...................... | B60N 2/36 297/481 |
| 9,308,889 B1 * | 4/2016 | Denninger | .............. | B60R 22/24 |

(Continued)

FOREIGN PATENT DOCUMENTS

| | | | | |
|---|---|---|---|---|
| CA | 2775789 A1 * | 10/2012 | ............. | B60N 2/242 |
| DE | 102018007450 A1 * | 3/2019 | ............. | B60R 22/24 |

(Continued)

*Primary Examiner* — Jacob D Knutson
*Assistant Examiner* — Maxwell L Meshaka
(74) *Attorney, Agent, or Firm* — Alan D. Kamrath; Karin L. Williams; Mayer & Williams PC

(57) ABSTRACT

A webbing height adjustment device is applied to connect to a webbing of a seat belt system. The webbing height adjustment device has a top ring member, a locking assembly, and a positioning member. The locking assembly is moveably disposed outside the top ring member. The positioning member is disposed on the side surface of the top ring member, is clutched with the locking assembly, and has a positioning element and at least one combining portion. The positioning element is disposed on the top ring member. The at least one combining portion is disposed on the positioning element and selectively and magnetically attracts the locking assembly for positioning. The webbing height adjustment device is easy to operate and automatically locks the webbing. The webbing height adjustment device can be adjusted continuously and occupies little space when not in use.

52 Claims, 38 Drawing Sheets

(56) References Cited

U.S. PATENT DOCUMENTS

| | | | |
|---|---|---|---|
| 9,738,248 B2* | 8/2017 | Dingman | B60R 22/24 |
| 10,173,635 B2* | 1/2019 | Wang | B60R 22/20 |
| 10,179,529 B1* | 1/2019 | Kondrad | B60N 2/688 |
| 10,493,949 B2* | 12/2019 | Jaradi | B60R 22/202 |
| 2009/0091115 A1* | 4/2009 | Bell | B60R 22/20 |
| | | | 280/801.2 |
| 2010/0213696 A1* | 8/2010 | Kawata | B60N 2/2812 |
| | | | 280/801.1 |
| 2012/0049600 A1* | 3/2012 | Parker | B60N 2/58 |
| | | | 297/378.1 |
| 2013/0069356 A1* | 3/2013 | You | B60R 22/24 |
| | | | 280/801.1 |
| 2014/0082894 A1* | 3/2014 | Walker | B60N 2/2803 |
| | | | 24/303 |
| 2014/0139005 A1* | 5/2014 | Rouhana | B60R 22/18 |
| | | | 297/476 |
| 2017/0021744 A1* | 1/2017 | Sanghera | B60N 2/2866 |
| 2017/0267209 A1* | 9/2017 | Wang | B60R 22/24 |
| 2018/0050657 A1* | 2/2018 | Wang | A44B 11/10 |
| 2019/0152429 A1* | 5/2019 | Jaradi | B60R 22/30 |

FOREIGN PATENT DOCUMENTS

| | | | | |
|---|---|---|---|---|
| EP | 2045147 A1 | 4/2009 | | |
| EP | 3335941 A1 | 6/2018 | | |
| EP | 3486126 A1 | 5/2019 | | |
| GB | 2347303 A | * | 8/2000 | B60R 11/0241 |
| KR | 2011085568 A | * | 7/2011 | |
| WO | WO2009045264 A2 | 4/2009 | | |

* cited by examiner

WEBBING HEIGHT ADJUSTMENT DEVICE

This application claims the benefit of Taiwan patent application No. 107124059, filed on Jul. 12, 2018, the partial contents of which are incorporated herein by reference,

BACKGROUND OF THE INVENTION

1. Field of the Invention

The present invention relates to a webbing height adjustment device, and more particularly to a webbing height adjustment device to adjust a height of an upper area of a three-point seat belt system of a vehicle.

2. Description of Related Art

A seat belt system is applied to a motor vehicle for protecting every occupant in the vehicle. In general, a retractor of the seat belt system is disposed on a support pillar in the vehicle. A webbing of the seat belt system is pulled out from the retractor of the seat belt system. The webbing of the seat belt system is passed through a top ring of the seat belt system, and then the webbing is obliquely passed the front of the occupant's torso. A tongue mounted around the webbing is inserted into a buckle mounted on a seat of the vehicle. A section of the webbing passes through the tongue and extends to a side of the seat near the retractor to form a three-point seat belt system. The body of the occupant in the vehicle is restrained on the seat in the vehicle by the webbing of the seat belt system.

In a conventional three-point seat belt system, when the webbing is fastened tightly, the height of the webbing near the shoulder of the occupant cannot be adjusted. In emergency, the neck of the occupant may be slashed by the webbing. A webbing height adjustment device is adopted to overcome the shortcoming that the height of the webbing cannot be adjusted. Therefore, with increasing awareness on vehicle safety, the height adjustment device for the webbing of the seat belt system is necessary.

A conventional webbing height adjustment device of the seat belt system is adapted to a specific vehicle and has some defects, such as complex structure, short range of adjustment, non-continuous adjustment, and complicated operation. Thus, it is necessary to invent a simplified, convenient, and useful webbing height adjustment device. According to the occupants with different builds, the height of the webbing can be adjusted by a new webbing height adjustment device for the webbing to stay close to the shoulder of the occupant in the vehicle and increasing the safety.

To overcome the shortcomings, the present invention provides a webbing height adjustment device to mitigate or obviate the aforementioned problems.

SUMMARY OF THE INVENTION

The objective of the invention is to provide a webbing height adjustment device that can solve the problems of the conventional webbing height adjustment device including complex structure, short range of adjustment, non-continuous adjustment, and complicated operation The webbing height adjustment device is applied to connect to a webbing of a seat belt system. The webbing height adjustment device has a top ring member, a locking assembly, and a positioning member.

The top ring member has a side surface, a retaining element, and a top ring. The retaining element has a bottom end. The top ring is connected to the bottom end of the retaining element. The webbing passes through the top ring.

The locking assembly is moveably disposed outside the top ring member and has a frame and a slider.

The frame is disposed outside the top ring member and has a body and a connecting portion. The body is disposed outside the top ring member and has a bottom end, a through hole, two sides, and two longitudinal side portions. The through hole is formed through the body. The two longitudinal side portions are disposed at the two sides of the body, respectively. The connecting portion is formed on the bottom end of the body and has a connecting hole formed on the connecting portion. The connecting portion is connected to a section of the webbing.

The slider is moveably disposed in the body of the frame and has two sides, a first plate portion, a second plate portion, and an insertion portion. The first plate portion is disposed at one of the two sides of the slider. The second plate portion is disposed at the other one of the two sides of the slider and is opposite to the first plate portion. The insertion portion is formed between the first plate portion and the second plate portion and has a through slot. The through slot is formed through the insertion portion. Another section of the webbing is inserted through the through slot. The section of the webbing inserted through the through slot is locked or unlocked by a relative motion between the frame and the slider.

The positioning member is disposed on the top ring member, is clutched with the locking assembly, and has a positioning element and at least one combining portion. The positioning element is disposed on the top ring member. The at least one combining portion is disposed on the positioning element and selectively and magnetically attracts the locking assembly for positioning.

As mentioned above, the frame is made of paramagnetic materials or magnetic materials. The body has a top end. The locking assembly has a positioning portion. The positioning portion is formed on and upwardly protrudes out of the top end of the body. The positioning element is disposed on a side surface of the retaining element of the top ring member, and has a central hole formed through the positioning element. A threaded element is inserted through the positioning element and the retaining element for positioning the positioning element and the retaining element. Each one of the at least one combining portion is a permanent magnet, is disposed on a bottom section of the positioning element, and selectively and magnetically attracts the positioning portion of the locking assembly. The locking assembly is magnetically attracted on the positioning member disposed on the side surface of the top ring member.

As mentioned above, the positioning element has a rear surface and two abutting rods. The rear surface of the positioning element faces the top ring member. The two abutting rods are disposed on the rear surface of the positioning element and abut against the retaining element for positioning.

As mentioned above, the frame is made of paramagnetic materials or magnetic materials. The body has a top end. The locking assembly has a positioning portion. The positioning portion is formed on and upwardly protrudes out of the top end of the body. The positioning element is disposed outside the retaining element of the top ring member. The positioning member has multiple combining portions in the at least one combining portion. The multiple combining portions are permanent magnets, are disposed on a bottom section of the positioning element, and selectively and magnetically attract the positioning portion of the frame. The locking assembly is magnetically attracted to the positioning member disposed on the side surface of the top ring member.

As mentioned above, the frame is made of paramagnetic materials or magnetic materials. The body has a top end. The locking assembly has a positioning portion. The positioning portion is formed on and bent backwardly from the top end of the body. The positioning element is disposed on a side surface of the retaining element of the top ring member, and has a bottom end and a central hole formed through the positioning element. A threaded element is inserted through the positioning element and the retaining element for positioning the positioning element and the retaining element. Each one of the at least one combining portion is a permanent magnet, is disposed on the bottom end of the positioning element, and selectively and magnetically attracts the positioning portion of the locking assembly. The locking assembly is magnetically attracted to the positioning member disposed on the side surface of the top ring member.

As mentioned above, the frame is made of paramagnetic materials or magnetic materials. The body has a top end. The locking assembly has a positioning portion. The positioning portion is formed on and bent backwardly from the top end of the body. The positioning element is disposed around and outside the top ring member and has a bottom end, a rear surface, a recess, and a hook. The recess is formed on the rear surface of the positioning element. The hook is formed on the rear surface of the positioning element and is located below the recess. The retaining element is embedded in the recess. The hook hangs on and is connected to the bottom end of the retaining element. Each one of the at least one combining portion is a permanent magnet, is disposed on the bottom end of the positioning element, and selectively and magnetically attracts the positioning portion of the locking assembly. The locking assembly is magnetically attracted to the positioning member disposed on the side surface of the top ring member.

As mentioned above, the connecting portion of the frame is connected to a connecting strap. The connecting strap is connected to a connecting element. The webbing passes through the connecting element.

As mentioned above, the first plate portion of the slider and the second plate portion vertically deviate from each other. The first plate portion has a top surface, a bottom section, and a bottom end. The second plate portion has a top surface, a top section, and a top end. The top surface of the first plate portion is higher than the top surface of the second plate portion. The insertion portion of the slider is formed between the bottom section of the first plate portion and the top section of the second plate portion, and has two side walls and two slide slots. The two side walls are disposed at two sides of the through slot, respectively. Each one of the two side walls is connected to the first plate portion and the second plate portion and has an outer surface. The two slide slots are respectively formed on the outer surfaces of the two side walls. Each one of the two slide slots is located between the first plate portion and the second plate portion. Two longitudinal side portions of the body are respectively inserted into the two slide slots. The through slot is sloped from the top end of the second plate portion toward the bottom end of the first plate portion and is located between the two side walls of the insertion portion.

As mentioned above, the locking assembly has a cover. The cover is moveably disposed around and outside the frame connected to the slider for driving the slider to move relative to the frame. The cover has a covering base and two covering side plates. The covering base has two side surfaces and a back surface. The two covering side plates are respectively formed on the two side surfaces of the covering base and are opposite to each other. The locking assembly has a positioning portion disposed on the back surface of the covering base and being a permanent magnet.

The positioning element is disposed on a side surface of the retaining element of the top ring member, and has a central hole formed through the positioning element. A threaded element is inserted through the positioning element and the retaining element for positioning the positioning element and the retaining element. Each one of the at least one combining portion is a permanent magnet and is disposed on a bottom section of the positioning element. The positioning portion and the at least one combining portion magnetically attract each other for positioning the locking assembly on the positioning member disposed on the side surface of the top ring member.

As mentioned above, the locking assembly has a cover. The cover is moveably disposed around and outside the frame for driving the slider to move relative to the frame. The cover has a covering base and two covering side plates. The covering base has two side surfaces and a back surface. The two covering side plates are respectively formed on the two side surfaces of the covering base and are opposite to each other. The locking assembly has a positioning portion disposed on the back surface of the covering base and being a permanent magnet. The positioning element is disposed outside the retaining element of the top ring member. Each one of the at least one combining portion is a permanent magnet and is disposed on a bottom section of the positioning element. The positioning portion and the at least one combining portion magnetically attract each other from front to rear for positioning the locking assembly on the positioning member disposed on the side surface of the top ring member.

As mentioned above, the locking assembly has a cover. The cover is moveably disposed around and outside the frame connected to the slider for driving the slider to move relative to the frame. The cover has a covering base and two covering side plates. The covering base has two side surfaces and a back surface. The two covering side plates are respectively formed on the two side surfaces of the covering base and are opposite to each other. The locking assembly has a positioning portion disposed on the back surface of the covering base and being a permanent magnet. The positioning element is disposed on a side surface of the retaining element of the top ring member, and has a central hole formed through the positioning element. A threaded element is inserted through the positioning element and the retaining element for positioning the positioning element and the retaining element. Each one of the at least one combining portion is a permanent magnet and is disposed on a bottom section of the positioning element. The positioning portion and the at least one combining portion magnetically attract each other from top to bottom for positioning the locking assembly on the positioning member disposed on the side surface of the top ring member.

The cover has a top stop portion formed on the back surface of the covering base. Each one of the two covering side plates has a top surface, a bottom surface, an inner surface, a guiding groove, and a bottom wall. The guiding groove is formed on the inner surface of the covering side plate, extends to the top surface of the covering side plate, and has a bottom. The bottom wall is formed on the bottom surface of the covering side plate and is located at the bottom of the guiding groove.

Two sides of the body of the frame are moveably and respectively inserted into the guiding grooves of the two covering side plates. The top stop portion is located above the top surfaces of the two covering side plates.

The webbing height adjustment device is applied to the seat belt system in the vehicle. The top ring member of the webbing height adjustment device is fixed on a central pillar of the vehicle or fixed in the vehicle above and behind a seat. The webbing of the seat belt system is passed through the top ring of the top ring member. The locking assembly is connected to two sections of the webbing for locking or unlocking the webbing. A height position of a top positioning point on the webbing can be adjusted continuously by the webbing height adjustment device. The webbing height adjustment device is easy to operate and automatically locks the webbing.

When the webbing height adjustment device is not in use, the locking assembly can move automatically and upwardly by the retracted webbing and is magnetically attracted to the positioning member disposed on a side surface of the top ring member. The webbing height adjustment device can be retracted above the central pillar to save space. The webbing can be pulled freely under an unlocked status.

When the height position of the top positioning point on the webbing needs to be adjusted, the locking assembly is detached from the positioning member disposed on the side surface of the top ring member and is held by an occupant. The height position of the positioning point on the webbing can be adjusted in an intuitive way by the locking assembly. The relative motion between the frame and the slider is generated to unlock the webbing. The height position of the positioning point is adjusted continuously. When the webbing height adjustment device may be moved to a suitable position, the locking assembly can be released. The frame and the slider of the locking assembly lock the webbing automatically by the tension of the webbing for ensuring that the positioning point of the webbing is close to the height of the shoulder of the occupant.

The webbing height adjustment device is adapted to three-point seat belt systems in various types of vehicles. The webbing adjustment device is simplified in structure, easy in operation, and cost-effective in manufacture and assembly. The webbing height adjustment device can be adjusted continuously. The adjustment range of the webbing height adjustment device is large. The webbing height adjustment device is easy to operate and automatically locks the webbing. The webbing height adjustment device occupies little space when not in use.

Other objectives, advantages and novel features of the invention will become more apparent from the following detailed description when taken in conjunction with the accompanying drawings.

DETAILED DESCRIPTION OF THE PREFERRED EMBODIMENT

With reference to FIGS. 1 to 37, a webbing height adjustment device in accordance with the present invention has multiple embodiments shown and described as follows.

Figure 1:
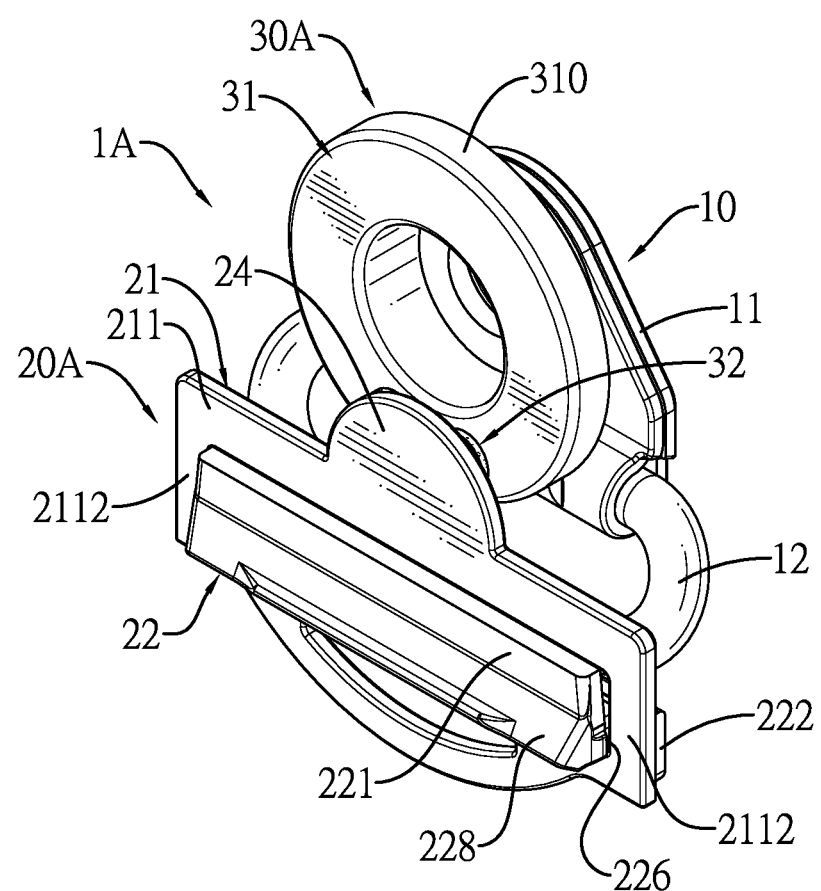
FIG. 1 is a perspective view of a first embodiment of a webbing height adjustment device in accordance with the present invention.
Figure 2:
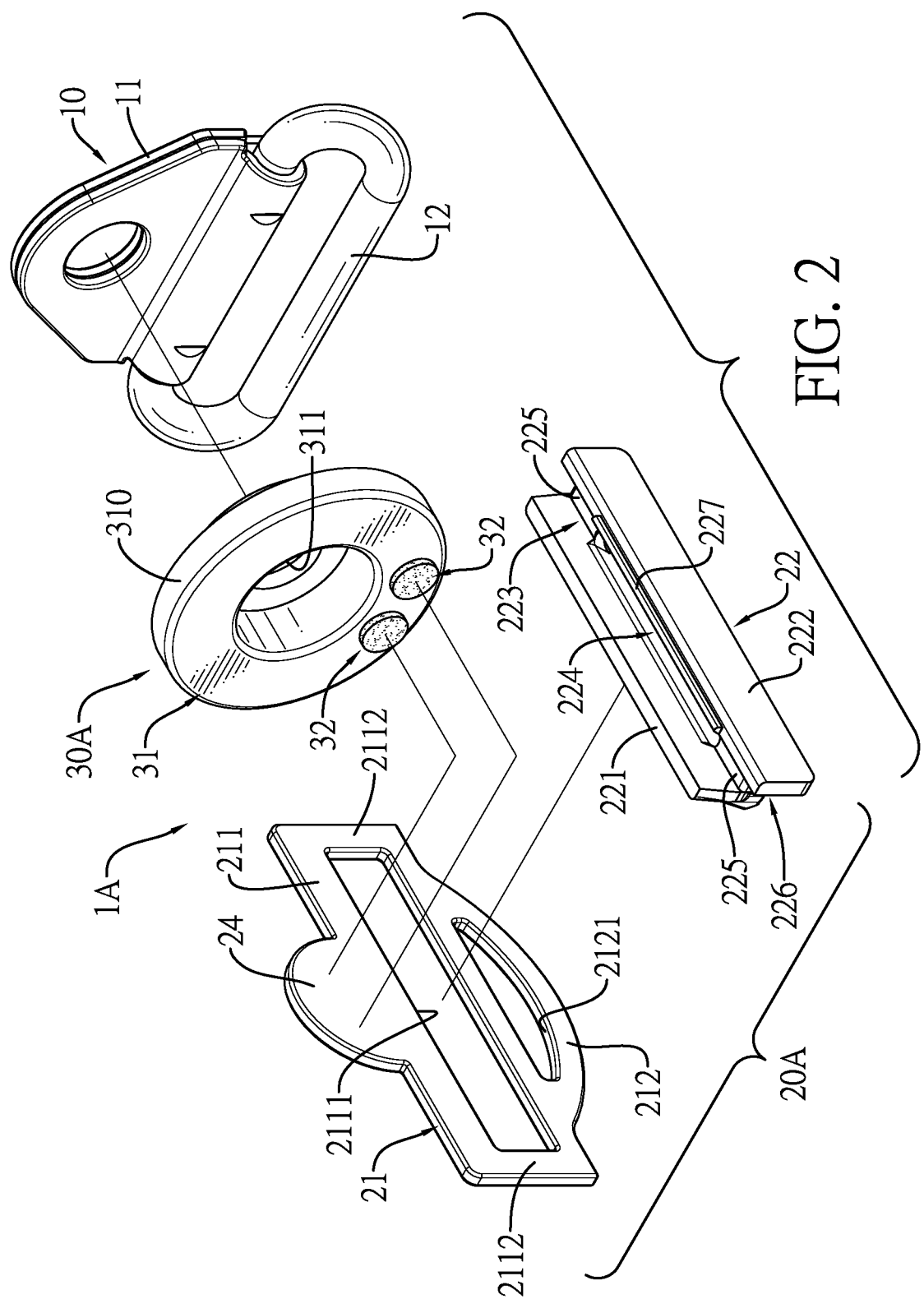
FIG. 2 is an exploded perspective view of the webbing height adjustment device in FIG. 1.

With reference to FIGS. 1 and 2, in a first embodiment of the webbing height adjustment device 1A, the webbing height adjustment device 1A has a top ring member 10, a locking assembly 20A, and a positioning member 30A.

Figure 3:
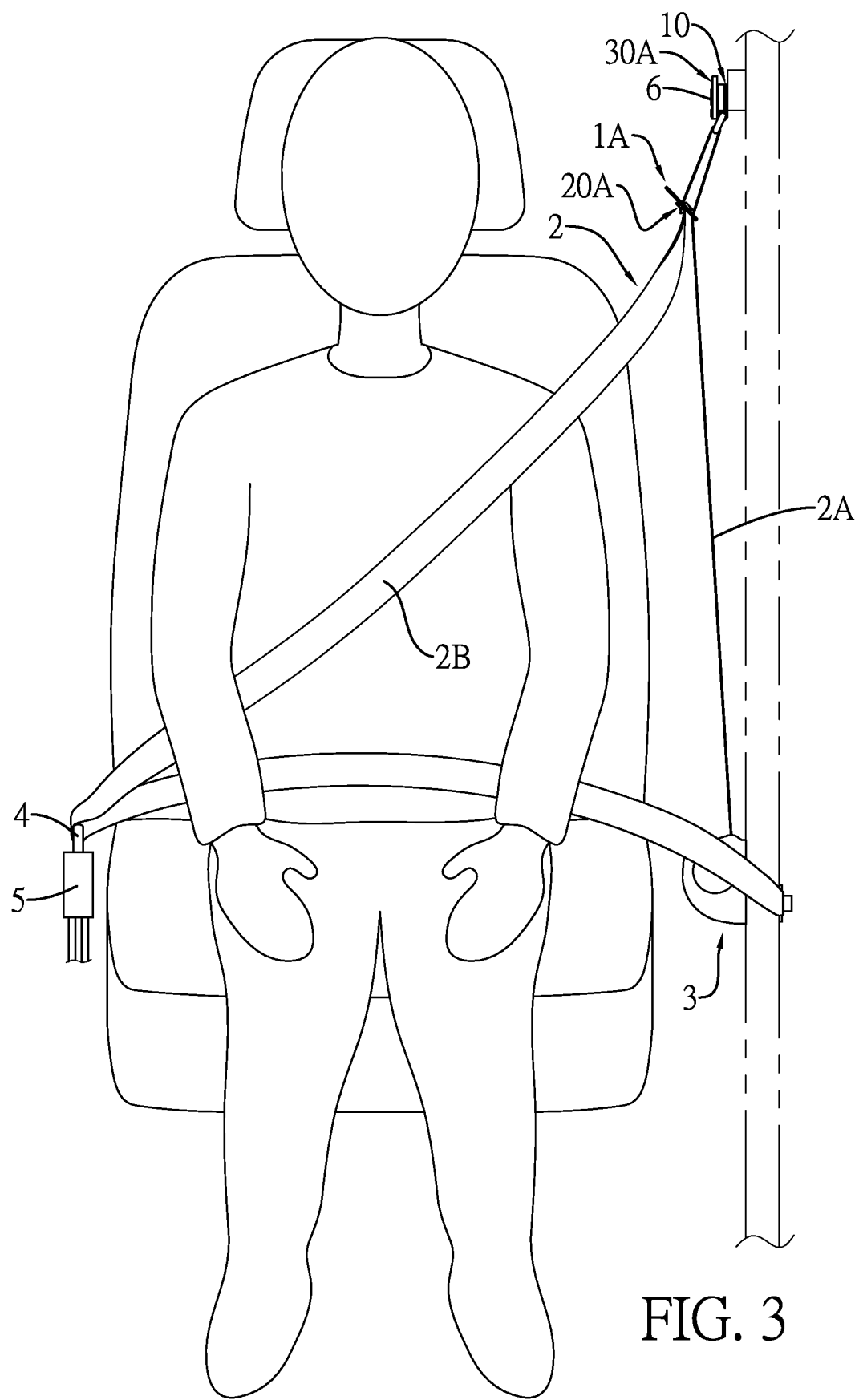
FIG. 3 is an operational front side view of the webbing height adjustment device in FIG. 1, showing the webbing height adjustment device is assembled on a seat belt system.

With reference to FIGS. 1 and 2, the top ring member 10 is fixed on a central pillar of a vehicle or fixed in the vehicle above and behind a seat in the vehicle. The top ring member 10 has a side surface, a retaining element 11, and a top ring 12. The retaining element 11 is fixed on a central pillar of a vehicle or fixed in the vehicle above and behind a seat in the vehicle and has a bottom end. The top ring 12 is fixedly connected to the bottom end of the retaining element 11. With reference to FIG. 3, a webbing 2 is disposed beside the seat or is fixed above and behind the seat, and passes through the top ring 12.

With reference to FIGS. 1 to 3, the locking assembly 20A is moveably disposed outside the top ring member 10 and is connected to two sections of the webbing 2 beside two sides of the top ring 12 for locking or unlocking the webbing 2. The locking assembly 20A has a frame 21 and a slider 22 moveably disposed in the frame 21. A relative motion between the frame 21 and the slider 22 can be generated for locking or unlocking the webbing 2.

With reference to FIGS. 1 and 2, in the locking assembly 20A, the frame 21 is made of paramagnetic materials or magnetic materials, such as iron, and can be magnetically attracted. The frame 21 is disposed outside the top ring member 10 and has a body 211 and a connecting portion 212. The body 211 is disposed outside the top ring member 10 and has a top end, a bottom end, a through hole 2111, two sides, and two longitudinal side portions 2112. The through hole 2111 is formed through the body 211. The two longitudinal side portions 2112 are straight and are disposed at the two sides of the body 211, respectively. The connecting portion 212 is formed on the bottom end of the body 211 and has a connecting hole 2121 formed on the connecting portion 212. The connecting hole 2121 may be a blind hole or an open hole formed as a slit. The locking assembly 20A has a positioning portion 24. The positioning portion 24 is formed on and upwardly protrudes out of the top end of the body 211. The positioning portion 24 is a plate protruding upwardly and can be magnetically attracted.

With reference to FIGS. 1 and 2, the slider 22 is moveably disposed in the body 211 of the frame 21. The slider 22 can move relative to the frame 21 along a moving direction of the webbing 2. The slider 22 has two sides, a first plate portion 221, a second plate portion 222, and an insertion portion 223. The first plate portion 221 is disposed at one of the two sides of the slider 22. The second plate portion 222 is disposed at the other one of the two sides of the slider 22 and is opposite to the first plate portion 221. The insertion portion 223 is formed between the first plate portion 221 and the second plate portion 222. The insertion portion 223 has a through slot 224, two side walls 225, and two slide slots 226. The through slot 224 is formed through the insertion portion 223. The two side walls 225 are disposed at two sides of the through slot 224, respectively. Each one of the two side walls 225 is connected to the first plate portion 221 and the second plate portion 222. The two slide slots 226 are respectively formed on the outer surfaces of the two side walls 225. Each one of the two slide slots 226 is located between the first plate portion 221 and the second plate portion 222. The insertion portion 223 of the slider 22 is inserted through the through hole 2111 of the body 211. The first plate portion 221 and the second plate portion 222 of the slider 22 are respectively located at two sides of the frame 21. The two longitudinal side portions 2112 of the body 211 are respectively inserted into the two slide slots 226 of the insertion portion 223 in the slider 22. The insertion portion 223 of the slider 22 is limited by the through hole 2111 of the body 211. The slider 22 moves in a limited range defined in the body 211 of the frame 21.

With reference to FIGS. 1 and 2, in the slider 22, the first plate portion 221 and the second plate portion 222 vertically deviate from each other. The first plate portion 221 has a top surface, a bottom section, and a bottom end. The second plate portion 222 has a top surface, a top section, and a top end. The top surface of the first plate portion 221 is higher than the top surface of the second plate portion 222. Each one of the two side walls 225 is connected to a back side of the bottom section of the first plate portion 221 and a front side of the top section of the second plate portion 222. The through slot 224 is sloped from the top end of the second plate portion 222 toward the bottom end of the first plate portion 221 and is located between the two side walls 225. The second plate portion 222 has a top flange 227 formed on the top surface of the second plate portion 222. The first plate portion 221 has a wedge protrusion 228. The wedge protrusion 28 is formed on and protrudes out of a side surface of the bottom section of the first plate portion 221.

Figure 20:
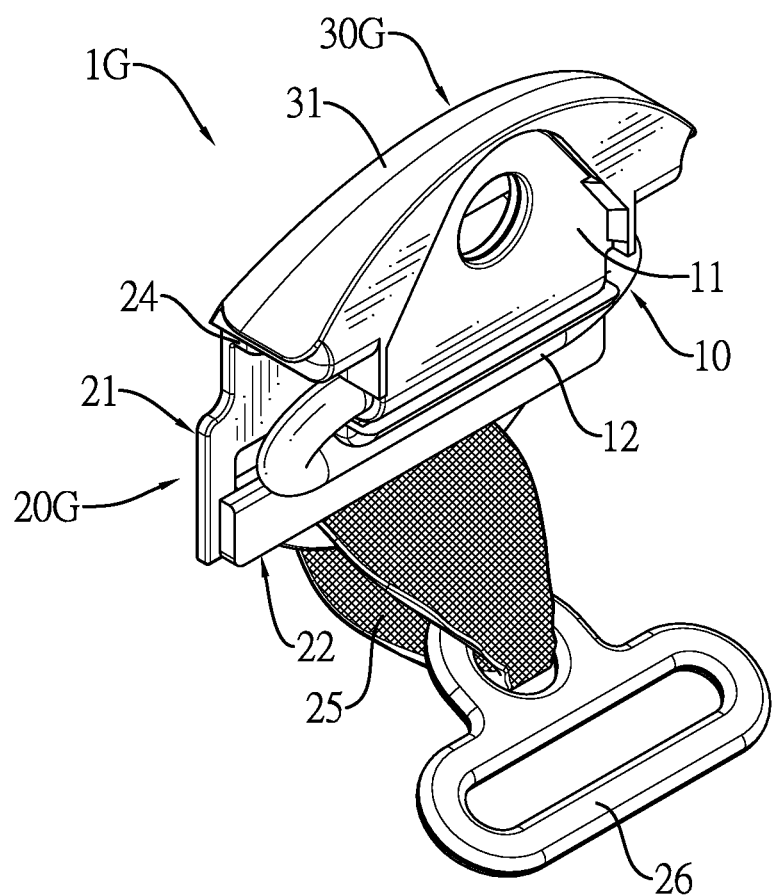
FIG. 20 is another perspective view of the webbing height adjustment device in FIG. 19.
Figure 21:
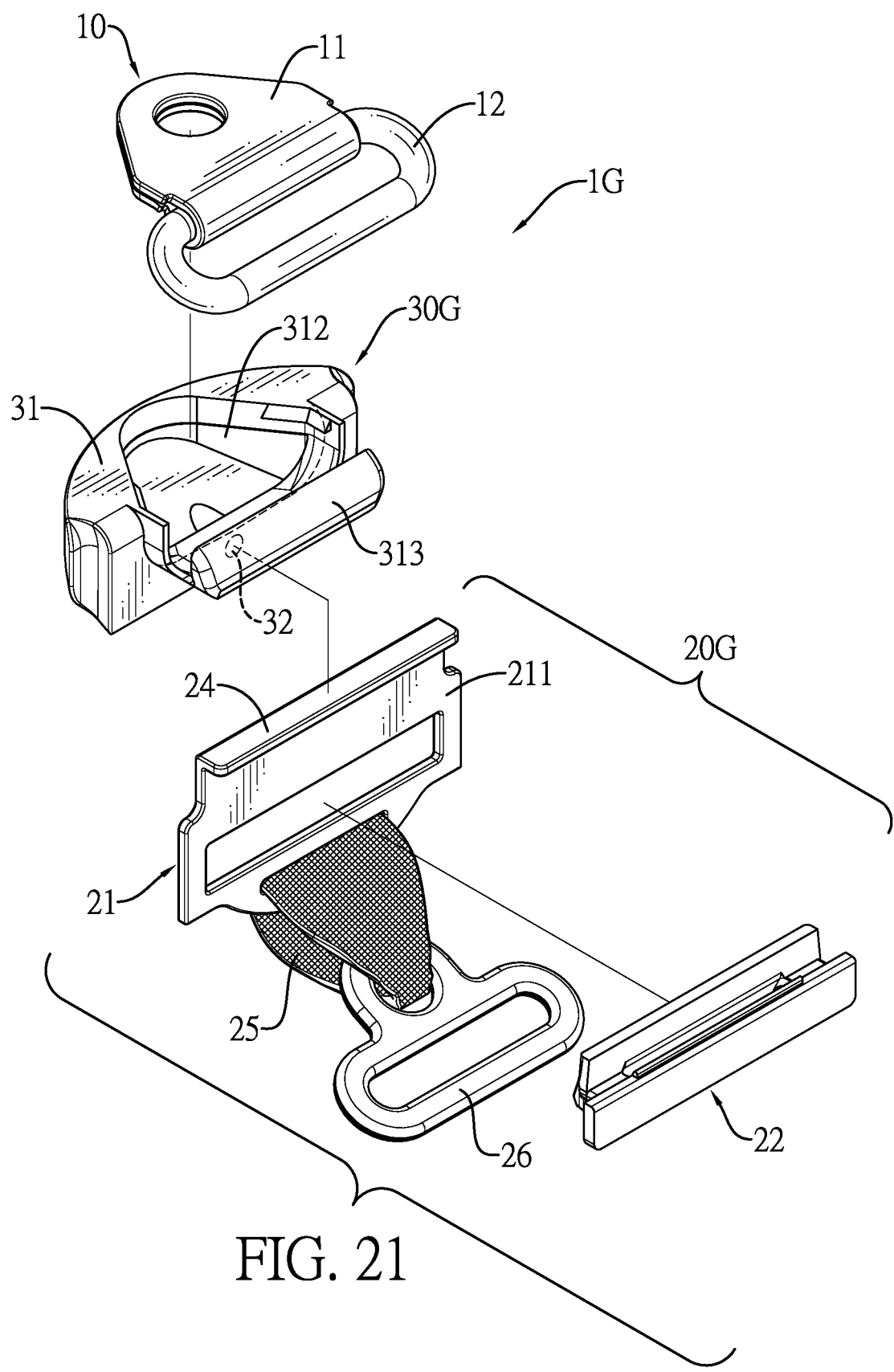
FIG. 21 is an exploded perspective view of the webbing height adjustment device in FIG. 20.

With reference to FIGS. 1 and 2, the webbing 2 is directly inserted through the connecting hole 2121 of the connecting portion 212 in the frame 21. With reference to FIGS. 20 and 21, the connecting portion 212 can be connected to a connecting strap 25. The connecting strap 25 is connected to a connecting element 26. The webbing 2 is inserted through the connecting element 26. The connecting portion 212 of the frame 22 is indirectly connected to the webbing 2 by the connecting strap 25 and the connecting element 26 in series connection. The connecting strap 25 is a strap having elasticity or no elasticity.

With reference to FIGS. 1 and 2, the positioning member 30A is disposed on a side surface of the retaining element 11 of the top ring member 10, is fixed on the central pillar of the vehicle or fixed in the vehicle above and behind the seat n the vehicle, and is selectively clutched with the locking assembly 20A. The positioning member 30A has a positioning element 31 and at least one combining portion 32. The positioning element 31 is disposed on the top ring member 10 and has a base portion 310 being circular. The base portion 310 has a central hole 311 formed through the base portion 310. The at least one combining portion 32 is a permanent magnet, is disposed on a side surface of a bottom section of the positioning element 31, and selectively and magnetically attracts the positioning portion 24. The locking assembly 20A can be magnetically attracted to the positioning member 30A fixed on the top ring member 10. The locking assembly 20A can be oscillated relative to the positioning member 30A.

Figure 4:
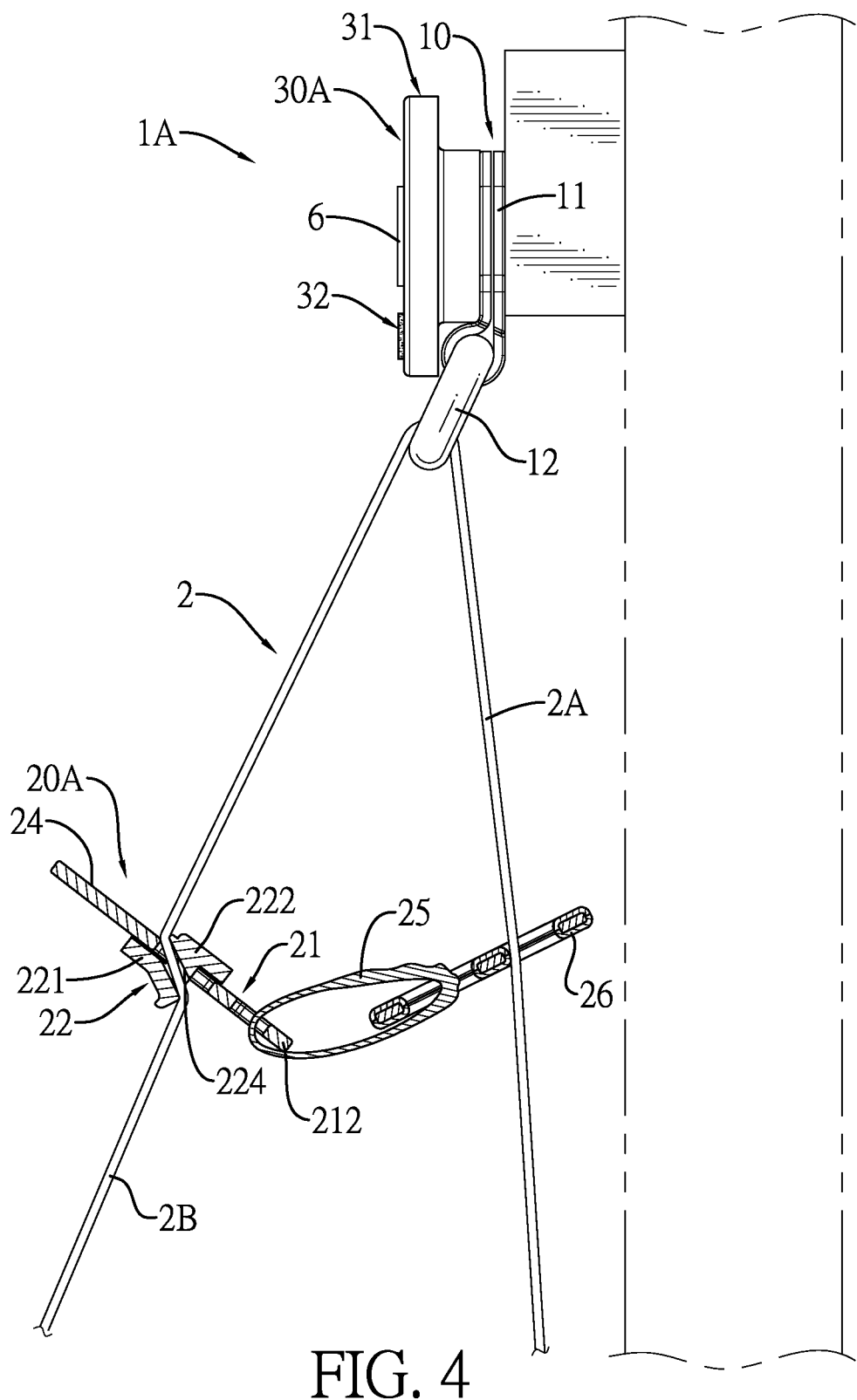
FIG. 4 is an enlarged and operational front side view in partial section of the webbing height adjustment device in FIG. 3.

In use, with reference to FIG. 3, the first embodiment of the webbing height adjustment device 1A is applied to a seat belt system in the vehicle. The retaining element 11 of the top ring member 10 and the positioning member 30A are oscillatably mounted on the central pillar of the vehicle or fixed in the vehicle above and behind the seat in the vehicle by a threaded element 6. The webbing 2 is pulled from a retractor 3 located beside the seat and is passed through the connecting portion 212 of the frame 21. With reference to FIG. 4, the connecting portion 212 can be connected to the connecting strap 25. The connecting strap 25 is connected to the connecting element 26. The webbing 2 is inserted through the connecting element 26.

Figure 5:
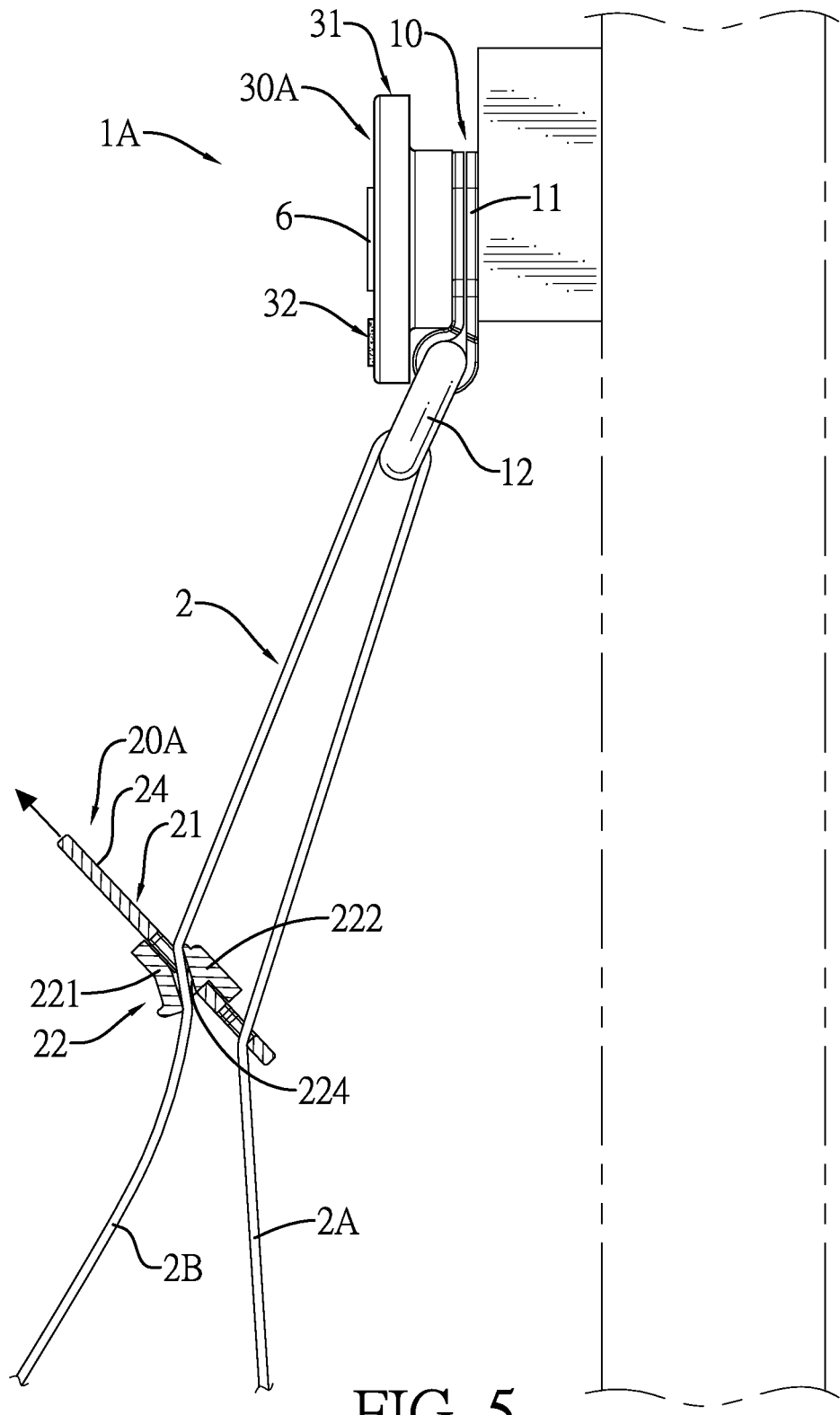
FIG. 5 is an operational front side view in partial section of the webbing height adjustment device in FIG. 3, showing a webbing is set in an unlocked state.

Then, with reference to FIGS. 3 to 5, the webbing 2 is passed through the top ring 12 of the top ring member 10 and the through slot 224 of the slider 22 located in the frame 21. The webbing 2 has a front section 2A and a rear section 2B. The front section 2A of the webbing 2 is defined between the top ring 12 and the retractor 3. The rear section 2B of the webbing 2 is connected to the front section 2A of the webbing 2 and is sequentially passed through the top ring 12, the frame 21, the slider 22, the tongue 4 and the retractor 3.

With reference to FIGS. 3 to 5, an occupant sits on the seat and the webbing 2 is fastened to abut the torso of the occupant. The tongue 4 connected to the rear section 2B is inserted into a buckle 5 located beside the seat. The rear section 2B of the webbing 2 is locked or unlocked by a relative motion between the frame 21 and the slider 22. The webbing height adjustment device 1A forms a positioning sliding point between the front section 2A and the rear section 2B near the top ring member 10.

Figure 6:
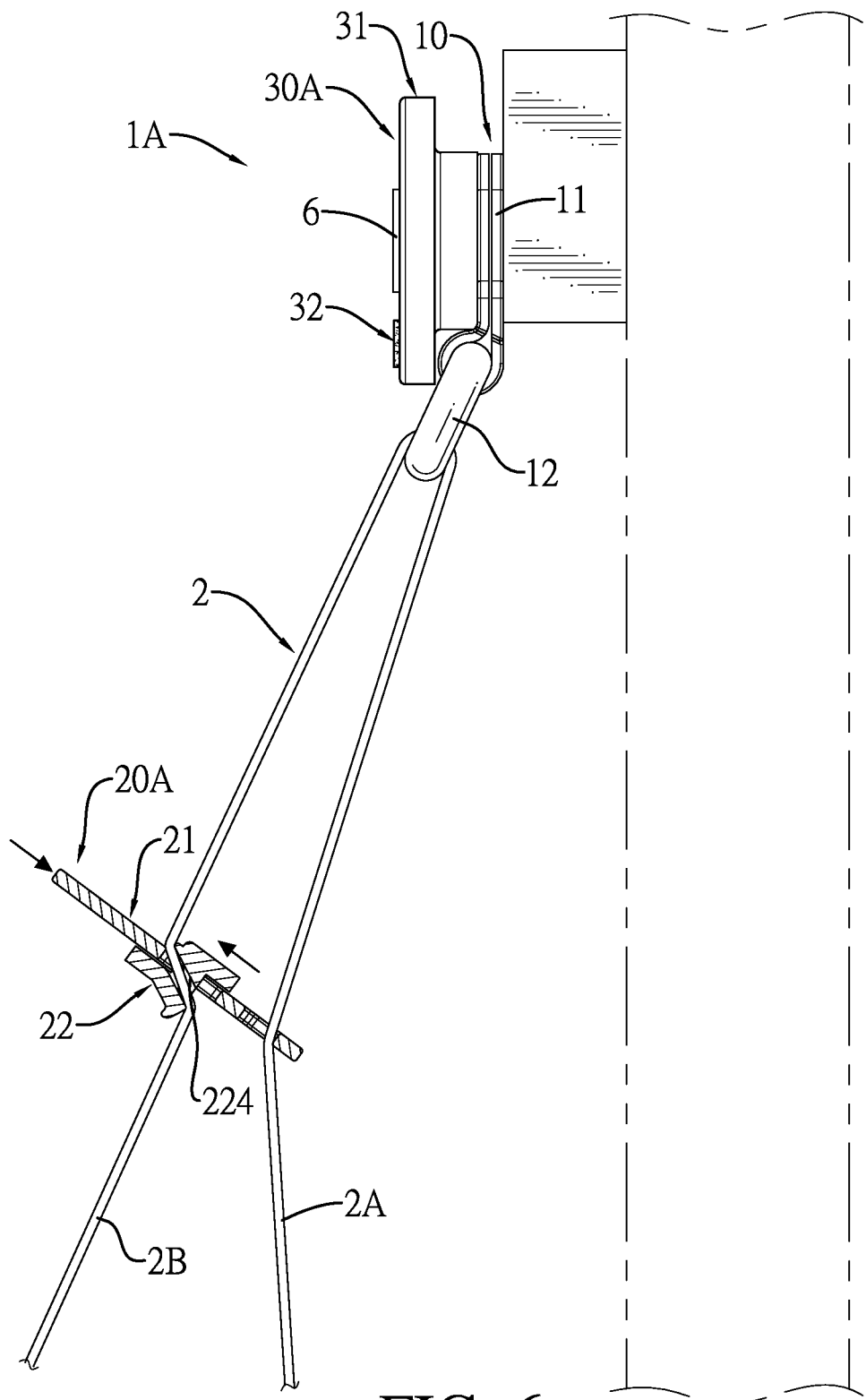
FIG. 6 is an operational front side view in partial section of the webbing height adjustment device in FIG. 3, showing the webbing is set in a locked state.

With reference to FIGS. 5 and 6, in the first embodiment, the webbing height adjustment device 1A can be adjusted to be located at the height position of the positioning point of the webbing 2 by the occupant. The frame 21 of the slider 22 of the locking assembly 20A can be held by one hand of the occupant. The relative motion between the frame 21 and the slider 22 is generated to unlock the rear section 2B of the webbing 2. The frame 21 is pushed upwardly, or the slider 20 is pulled downwardly with continuously adjustment. When the webbing height adjustment device 1A moves to a suitable position, the webbing height adjustment device 1A can be released. Under the tension of the webbing 2, the frame 21 and the slider 22 relatively move to secure the rear section 2B, and the webbing height adjustment device 1A generates sufficient friction to lock the webbing 2 automatically. The rear section 2B between the tongue 4 and the top ring member 10 is not allowed to move relative to the webbing height adjustment device 1A.

After the height of the webbing height adjustment device 1A on the webbing 2 is adjusted upwardly or downwardly, the locking assembly 20A can be released by the occupant. Under the tension of the webbing 2, the frame 21 and the slider relatively move to secure the rear section 2B, and the webbing height adjustment device 1A generates sufficient friction to lock the webbing 2 automatically. The rear section 2B between the tongue 4 and the top ring member 10 is not allowed to move relative to the webbing height adjustment device 1A.

Figure 7:
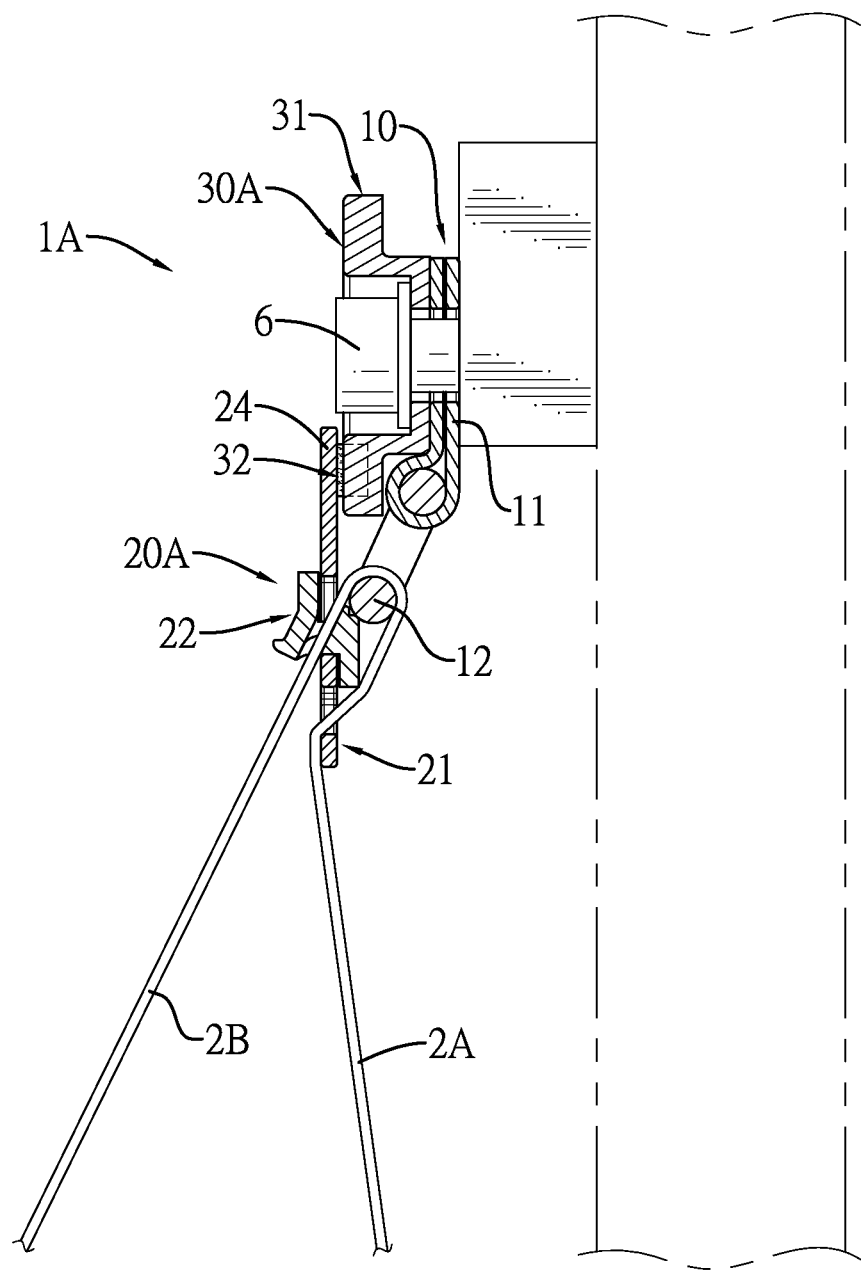
FIG. 7 is an operational front side view in partial section of the webbing height adjustment device in FIG. 3, showing a locking assembly is attracted to a positioning member.

When the first embodiment of the webbing height adjustment device 1A is not in use, or when the height position of the positioning point of the webbing 2 is not in adjustment, with reference to FIG. 7, the positioning portion 24 of the frame 21 is magnetically attracted to the at least one combining portion 32 of the positioning member 30A located at the side surface of the top ring member 10. The locking assembly 20A is oscillated relative to the positioning member 30A. The frame 21 and the slider 22 of the locking assembly 20A are unlocked relative to the webbing 2. The webbing 2 can be pulled freely. The locking assembly 20A is oscillated relative to the positioning member 30A for preventing the webbing 2 from rubbing.

Figure 8:
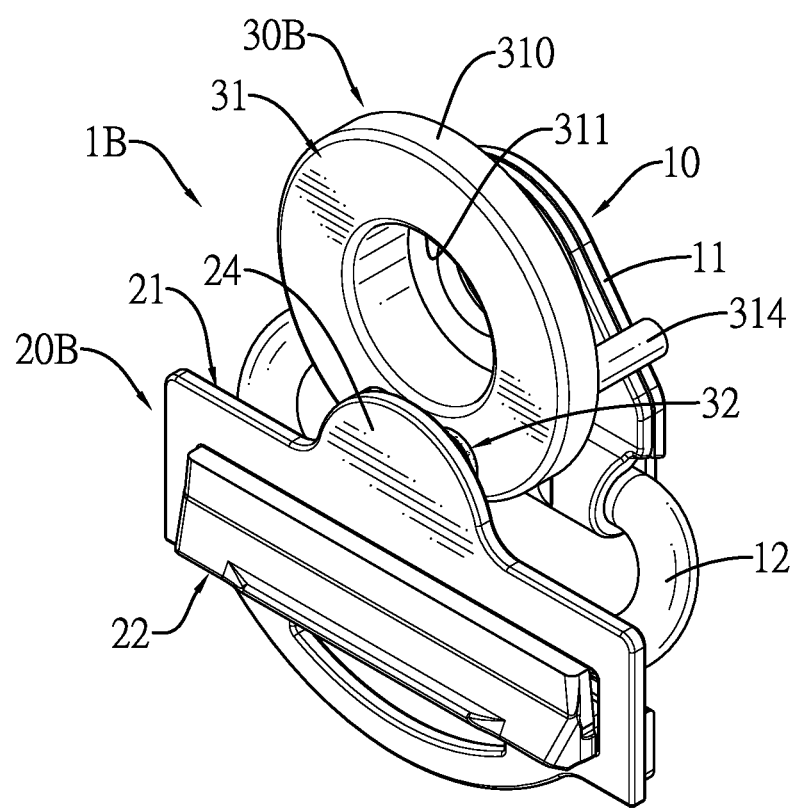
FIG. 8 is a perspective view of a second embodiment of a webbing height adjustment device in accordance with the present invention.
Figure 9:
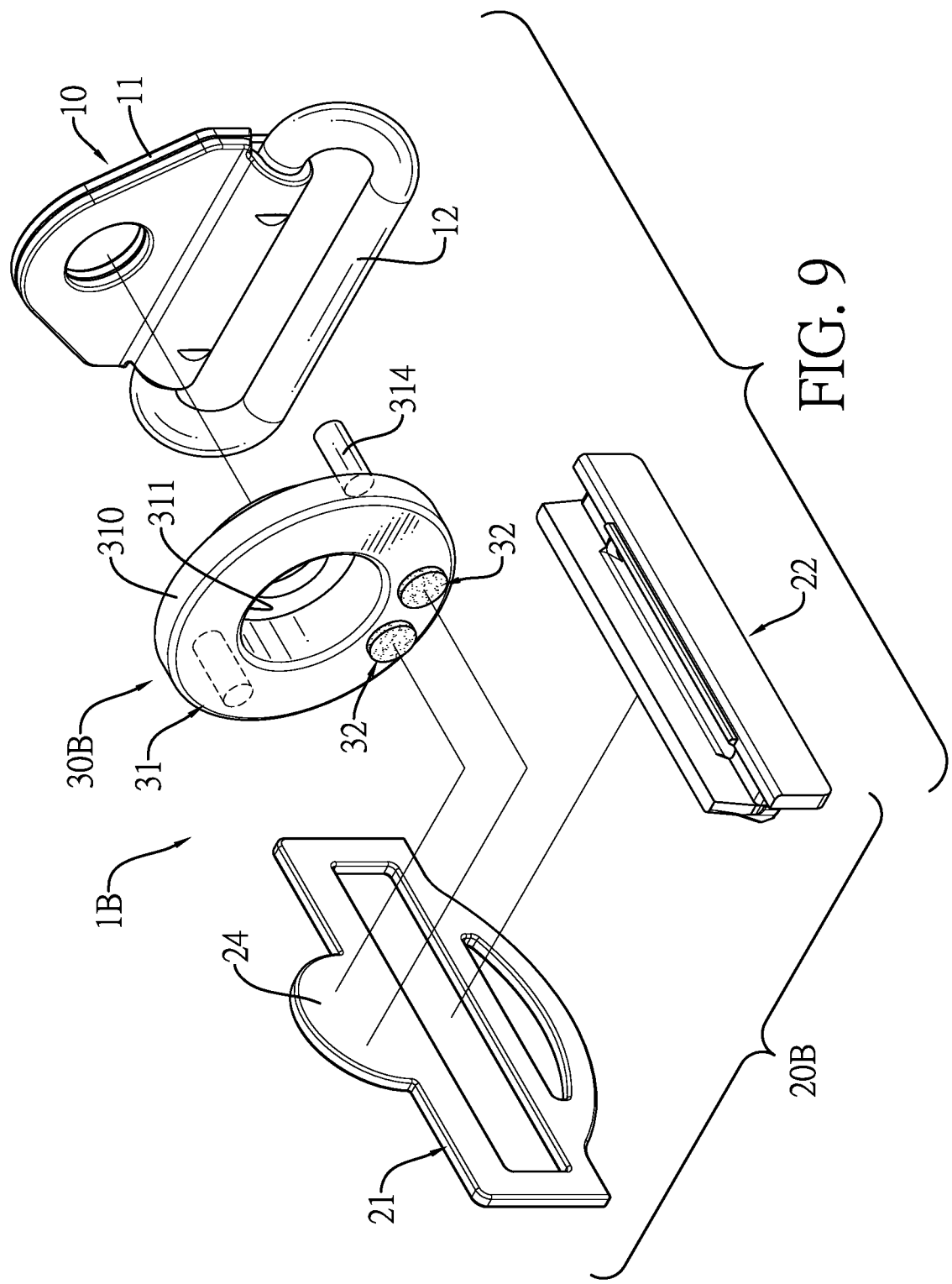
FIG. 9 is an exploded perspective view of the webbing height adjustment device in FIG. 8.

With reference to FIGS. 8 and 9, in a second embodiment of the webbing height adjustment device 1B, structure of the second embodiment of the webbing height adjustment device 1B is mostly similar to structure of the first embodiment of the webbing height adjustment device 1A. The difference between the first embodiment and the second embodiment of the webbing height adjustment device 1A, 1B is described as follows.

In the positioning member 30B of the second embodiment of the webbing height adjustment device 1B, the base portion 310 has a rear surface facing the top ring member 10, and the positioning member 30B has two abutting rods 314. The two abutting rods 314 are disposed on and backwardly protrude out of the rear surface of the base portion 310. The positioning element 31 and the retaining element 11 of the top ring member 10 are disposed on the central pillar of the vehicle by the threaded element 6. The base portion 310 of the positioning member 31 is fixed on the side surface of the retaining element 11. The abutting rods 314 abut against the retaining element 11 for preventing the locking assembly 20B and the positioning member 30B from oscillating relative to each other.

Operations of the first embodiment and the second embodiment of the webbing height adjustment device 1A, 1B are mostly the same. The operation of the second embodiment of the webbing height adjustment device 1B will not be described herein.

Figure 10:
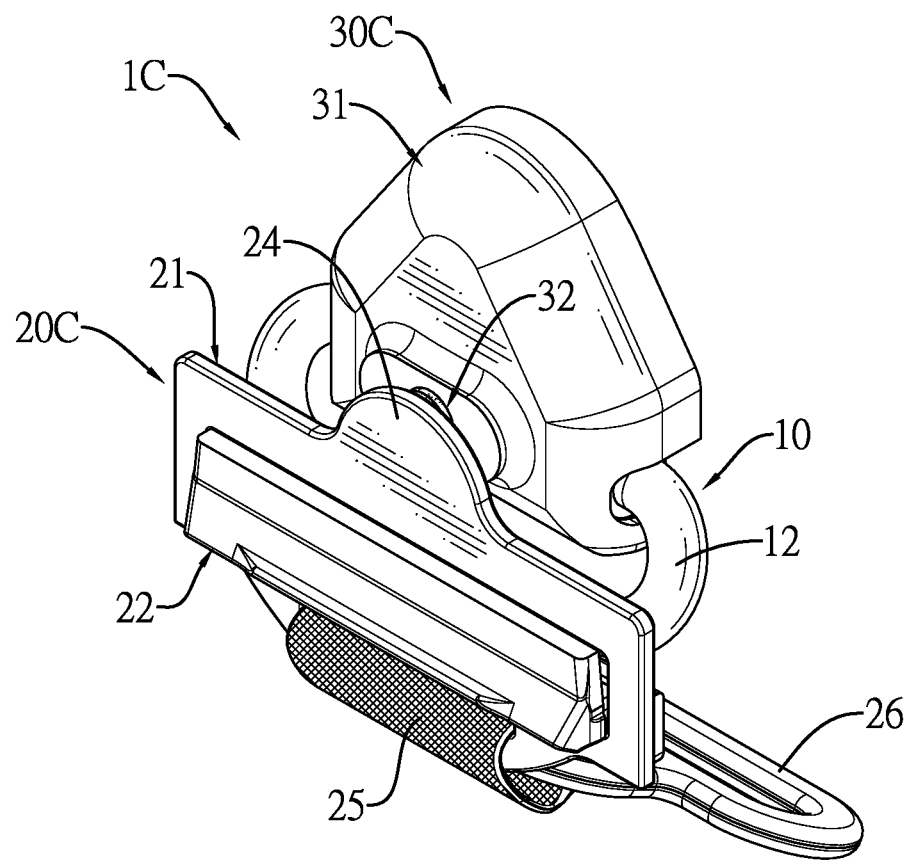
FIG. 10 is a perspective view of a third embodiment of a webbing height adjustment device in accordance with the present invention.
Figure 11:
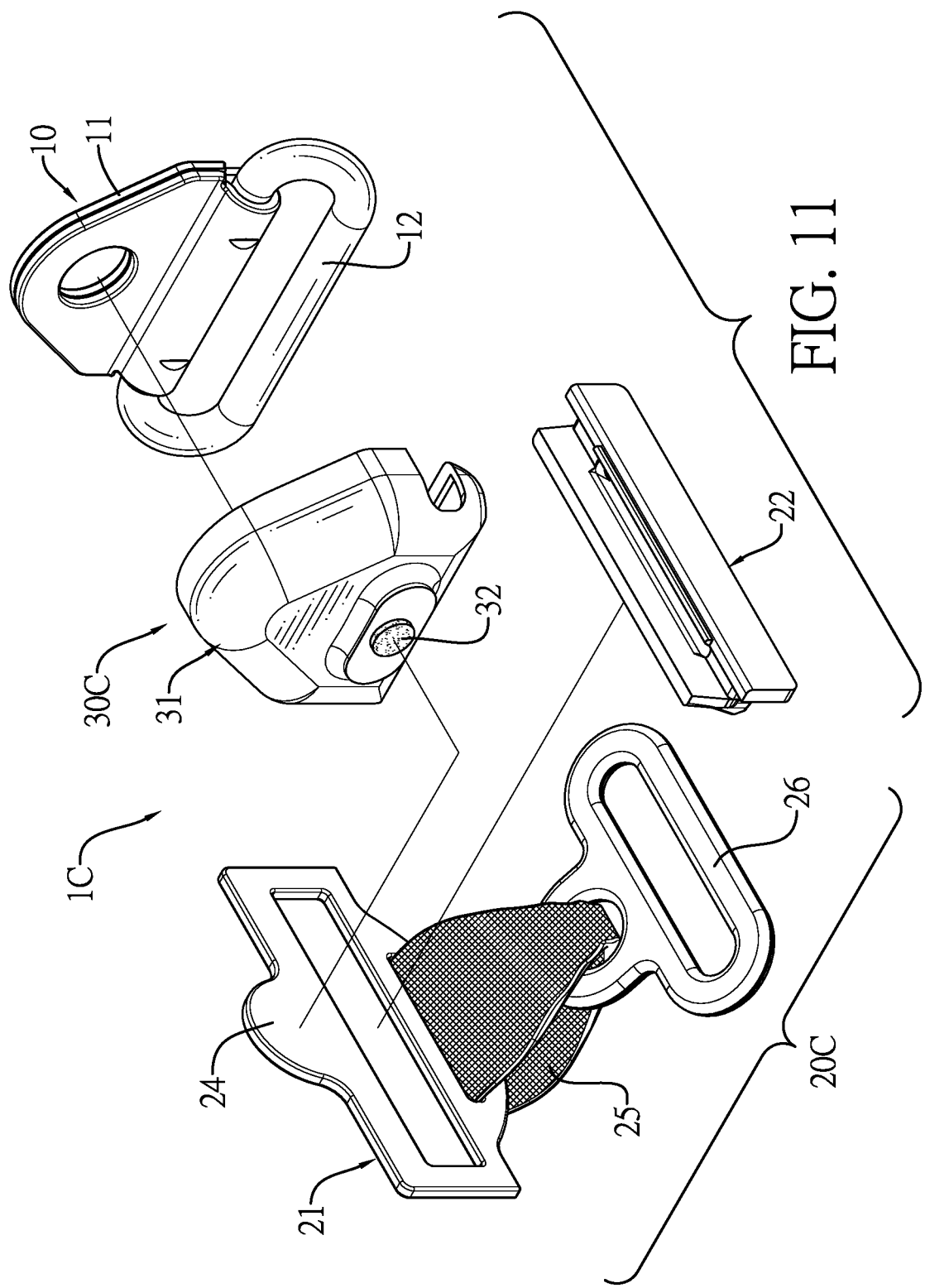
FIG. 11 is an exploded perspective view of the webbing height adjustment device in FIG. 10.

With reference to FIGS. 10 and 11, in a third embodiment of the webbing height adjustment device 1C, the webbing height adjustment device 1C has the top ring member 10, the locking assembly 20C, and the positioning member 30C. Structures of the top ring member 10, the locking assembly 20C, and the positioning member 30C of the third embodiment of the webbing height adjustment device 1C are mostly similar to structures of the top ring member 10, the locking assembly 20A, and the positioning member 30A shown in the first embodiment of the webbing height adjustment device 1A. The difference between the first embodiment and the third embodiment of the webbing height adjustment device 1A, 1C is in shapes of the positioning members 30A, 30C.

With reference to FIGS. 3, 4, 10, and 11, in the third embodiment of the webbing height adjustment device 1C, the locking assembly 20C is moveably disposed outside the side surface of the top ring member 10 for locking or unlocking the sections of the webbing 2 located at two sides of the top ring 12. The locking assembly 20C has the frame 21 and the slider 22 disposed in the frame 21. The frame 21 is made of paramagnetic materials or magnetic materials such as iron. The positioning portion 24 formed on the top end of the body 211 is a plate protruding upwardly without any hole. The slider 22 can move relative to the frame 21. The locking assembly 20C shown in the third embodiment of the webbing height adjustment device 1C is same to the locking assembly 20A shown in the first embodiment of the webbing height adjustment device 1A and will not be described herein.

With reference to FIGS. 10 and 11, in the third embodiment of the webbing height adjustment device 1C, the positioning member 30C has a positioning element 31 and a combining portion 32. The positioning element 31 is disposed on and outside the side surface of the retaining element 11 of the top ring member 10. The combining portion 32 is a permanent magnet, is disposed on the side surface of the bottom section of the positioning element 31, and selectively and magnetically attracts the positioning portion 24 of the frame 21. The locking assembly 20C can be single-point magnetically attracted to the positioning member 30C combined with the top ring member 10. The locking assembly 20C can be oscillated relative to the positioning member 30C.

With reference to FIGS. 10 and 11, in the third embodiment of the webbing height adjustment device 1C, the connecting portion 212 is connected to the connecting strap 25. The connecting strap 25 is connected to the connecting element 26. The webbing 2 is passed through the connecting element 26. The connecting portion 212 of the frame 21 is indirectly connected to the webbing 2 by the connecting strap 25 and the connecting element 26 in series connection.

With reference to FIGS. 10 and 11, operations of the first embodiment and the third embodiment of the webbing height adjustment device 1A, 1C are mostly the same. When the locking assembly 20C in the third embodiment of the webbing height adjustment device 1C is retracted, the locking assembly 20C can be magnetically attracted to the positioning member 30C disposed on the side surface of the top ring member 10.

Figure 12:
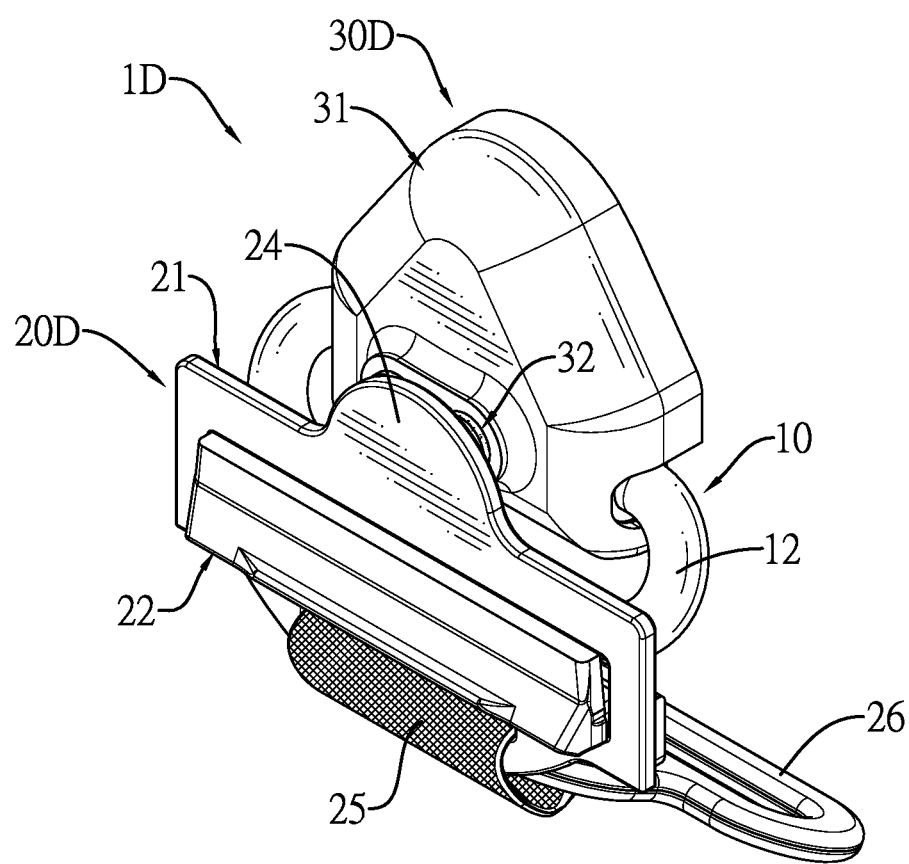
FIG. 12 is a perspective view of a fourth embodiment of a webbing height adjustment device in accordance with the present invention.
Figure 13:
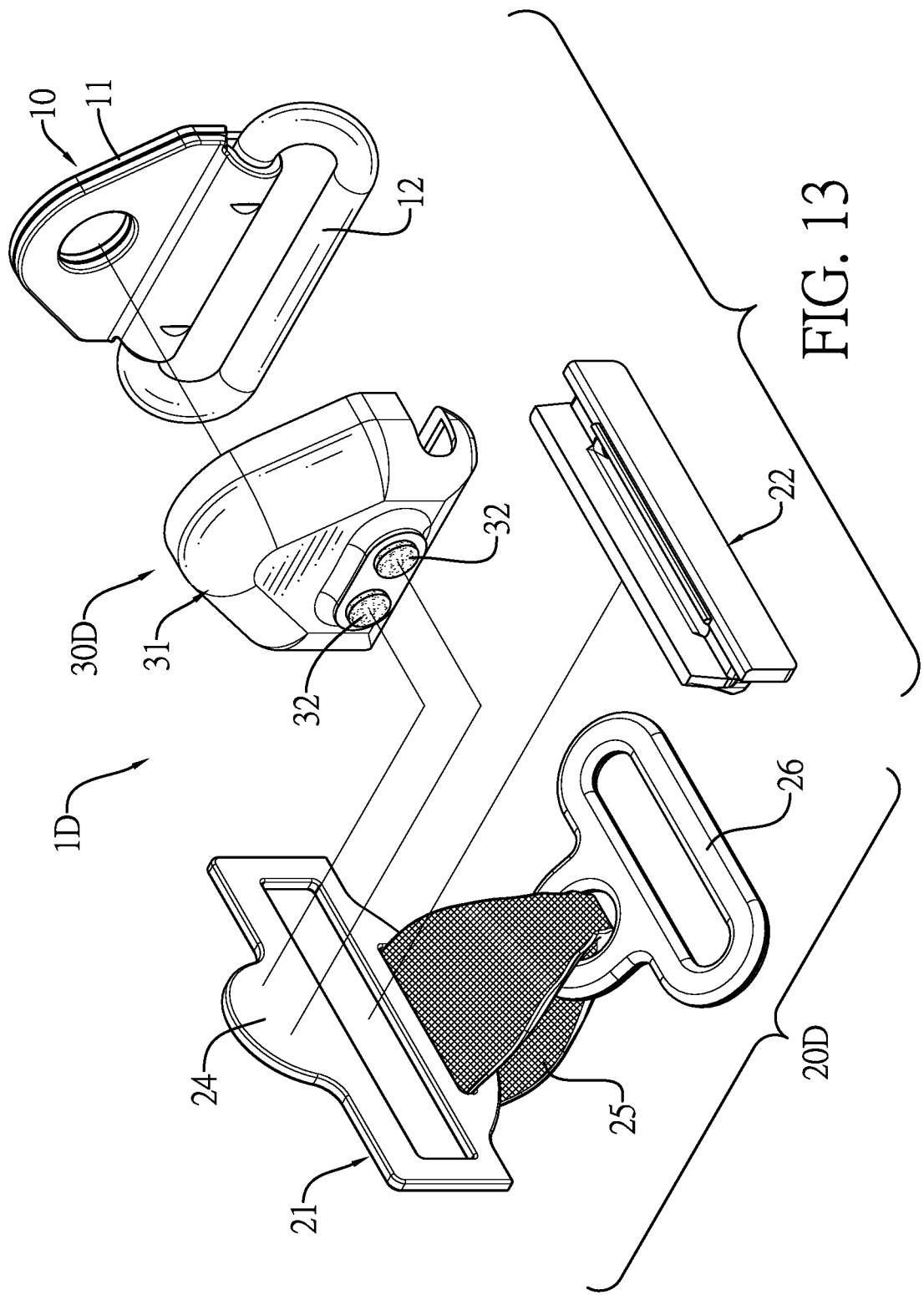
FIG. 13 is an exploded perspective view of the webbing height adjustment device in FIG. 12.

With reference to FIGS. 12 and 13, in a fourth embodiment of the webbing height adjustment device 1D, the webbing height adjustment device 1D has the top ring member 10, the locking assembly 20D, and the positioning member 30D. Structures of the top ring member 10, the locking assembly 20D, and the positioning member 30D of the fourth embodiment of the webbing height adjustment device 1D are mostly similar to structures of the top ring member 10, the locking assembly 20C, and the positioning member 30C shown in the third embodiment of the webbing height adjustment device 1C. The difference in the third embodiment and the fourth embodiment of the webbing height adjustment device 1C, 1D is in the amount of the combining portions 32. The amount of the combining portions 32 in the fourth embodiment of the webbing height adjustment device 1D is increased for increasing the magnetic force. The locking assembly 20C is not easy to oscillate relative to the positioning member 30D.

Operations of the third embodiment and the fourth embodiment of the webbing height adjustment device 1C, 1D are mostly the same and will not be described herein.

Figure 14:
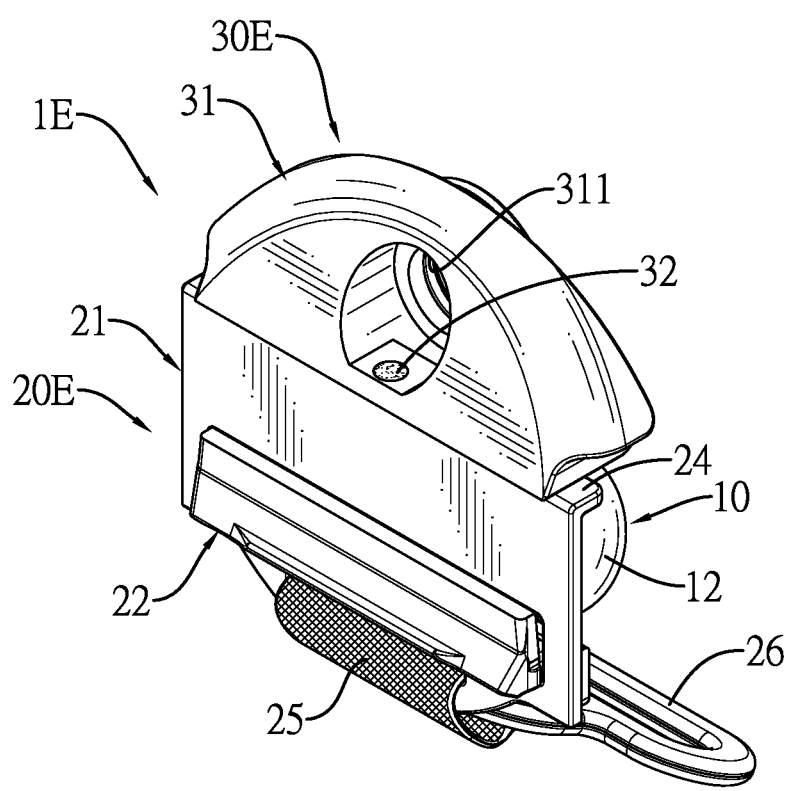
FIG. 14 is a perspective view of a fifth embodiment of a webbing height adjustment device in accordance with the present invention.
Figure 15:
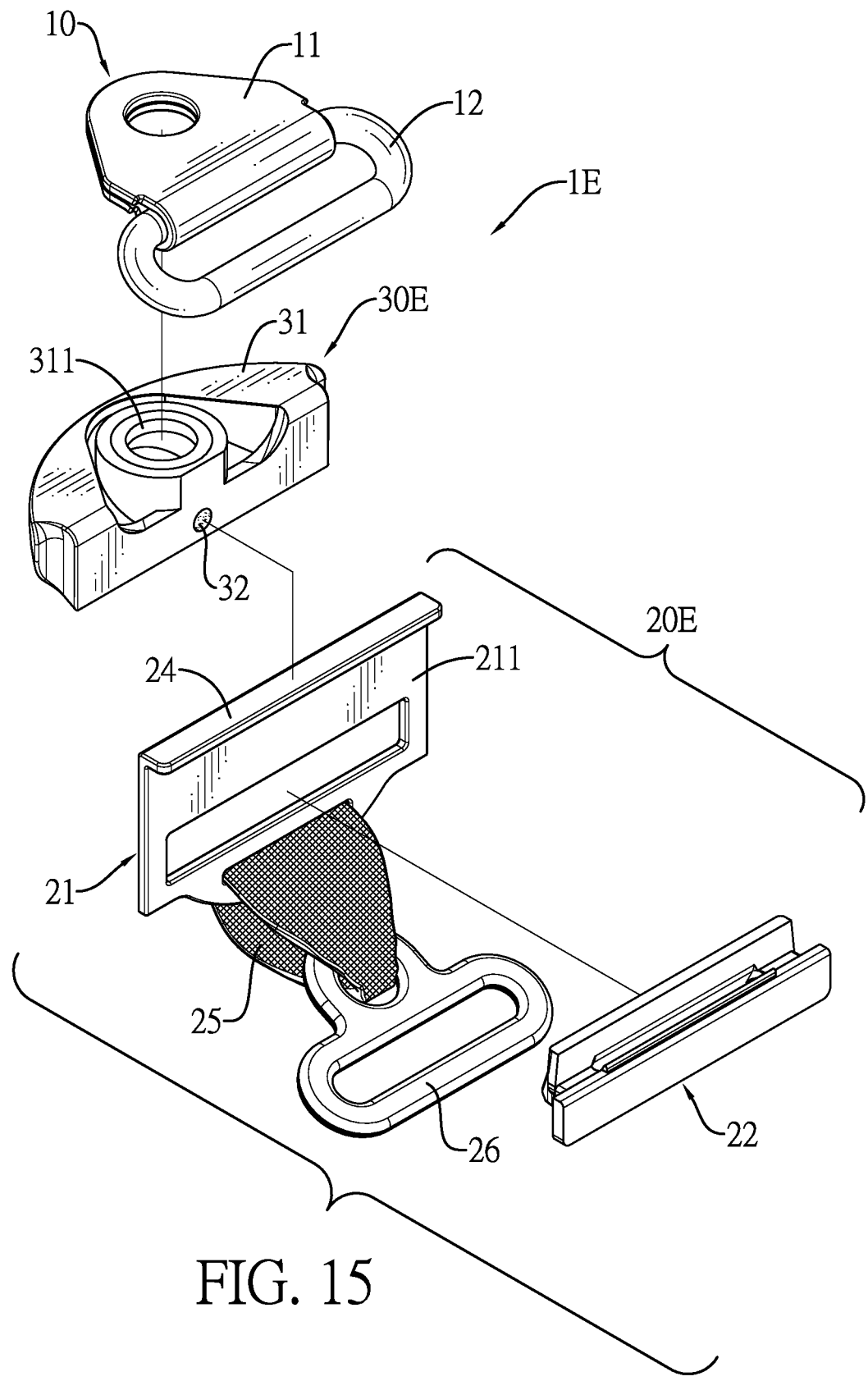
FIG. 15 is an exploded perspective view of the webbing height adjustment device in FIG. 14.

With reference to FIGS. 14 and 15, in a fifth embodiment of the webbing height adjustment device 1E, the webbing height adjustment device 1E has the top ring member 10, the locking assembly 20E, and the positioning member 30E. Structures of the top ring member 10, the locking assembly 20E, and the positioning member 30E of the fifth embodiment of the webbing height adjustment device 1E are mostly similar to structures of the top ring member 10, the locking assembly 20A, and the positioning member 30A shown in the first embodiment of the webbing height adjustment device 1A. The locking assembly 20A, 20E can be selectively and magnetically attracted to the positioning member 30A, 30E disposed on the side surface of the top ring member 10 in the first embodiment and the fifth embodiment of the webbing height adjustment device 1A, 1E. The difference between the first embodiment and the fifth embodiment of the webbing height adjustment device 1A, 1E is their assembling ways. The assembling way of the locking assembly 20E in the fifth embodiment of the webbing height adjustment device 1E is different from the assembling way of the locking assembly 20A in the first embodiment of the webbing height adjustment device 1A.

With reference to FIGS. 14 and 15, in the fifth embodiment of the webbing height adjustment device 1E, the frame 21 is made of paramagnetic materials or magnetic materials such as iron. The positioning portion 24 formed on the top end of the body 211 is a plate bent backwardly and can be magnetically attracted. The positioning member 30E has a positioning element 31 and a combining portion 32. The positioning element 31 has the central hole 311 formed through the positioning element 31. The positioning element 31 is disposed on the side surface of the retaining element 11 of the top ring member 10. The positioning element 31 and the retaining element 11 are fixed on the central pillar of the vehicle by a threaded element 6. The combining portion 32 is a permanent magnet, is disposed on the bottom end of the positioning element 31, and selectively and magnetically attracts the positioning portion 24 bent backwardly on the frame 21. The locking assembly 20E can be attracted to the positioning member 30E disposed on the side surface of the top ring member 10.

With reference to FIGS. 14 and 15, in the fifth embodiment of the webbing height adjustment device 1E, the connecting portion 212 is connected to the connecting strap 25 having elasticity. The connecting strap 25 is connected to the connecting element 26. The webbing 2 is passed through the connecting element 26. The connecting portion 212 of the frame 21 is indirectly connected to the webbing 2 by the connecting strap 25 and the connecting element 26 in series connection.

Operations of the first embodiment and the fifth embodiment of the webbing height adjustment device 1A, 1E are mostly the same. The difference between the first embodiment and the fifth embodiment of the webbing height adjustment device 1A, 1E is described as follows. In the fifth embodiment of the webbing height adjustment device 1E, when the locking assembly 20E is retracted, the frame 21 can be magnetically attracted to the bottom end of the positioning element 31 disposed on the side surface of the top ring member 10. In the first embodiment of the webbing height adjustment device 1A, when the locking assembly 20A is retracted, the frame 21 can be magnetically attracted to the bottom section of the side surface of the positioning element 31 disposed on the side surface of the top ring member 10.

Figure 16:
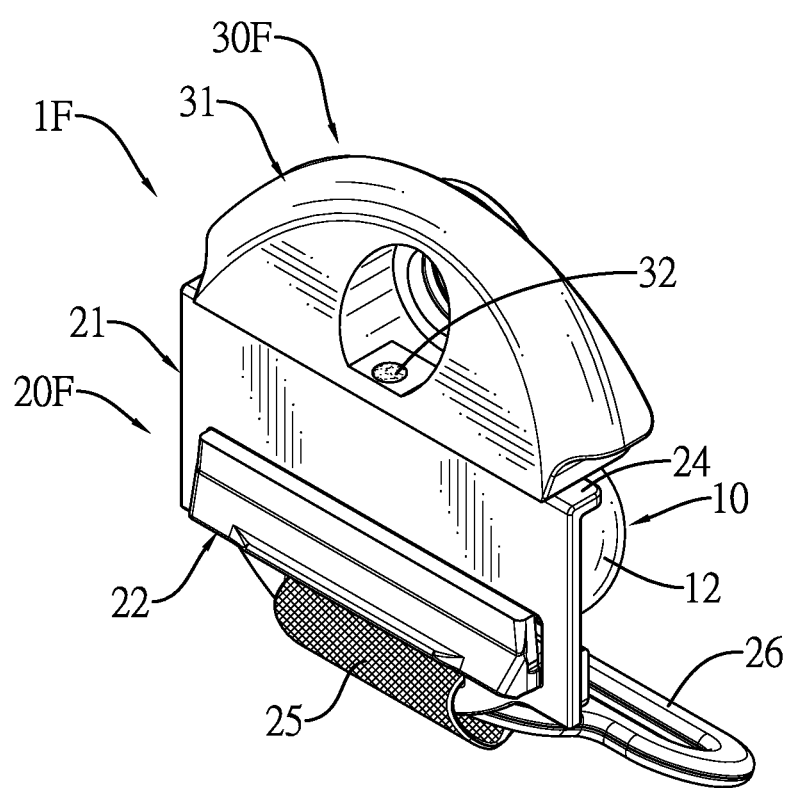
FIG. 16 is a perspective view of a sixth embodiment of a webbing height adjustment device in accordance with the present invention.
Figure 17:
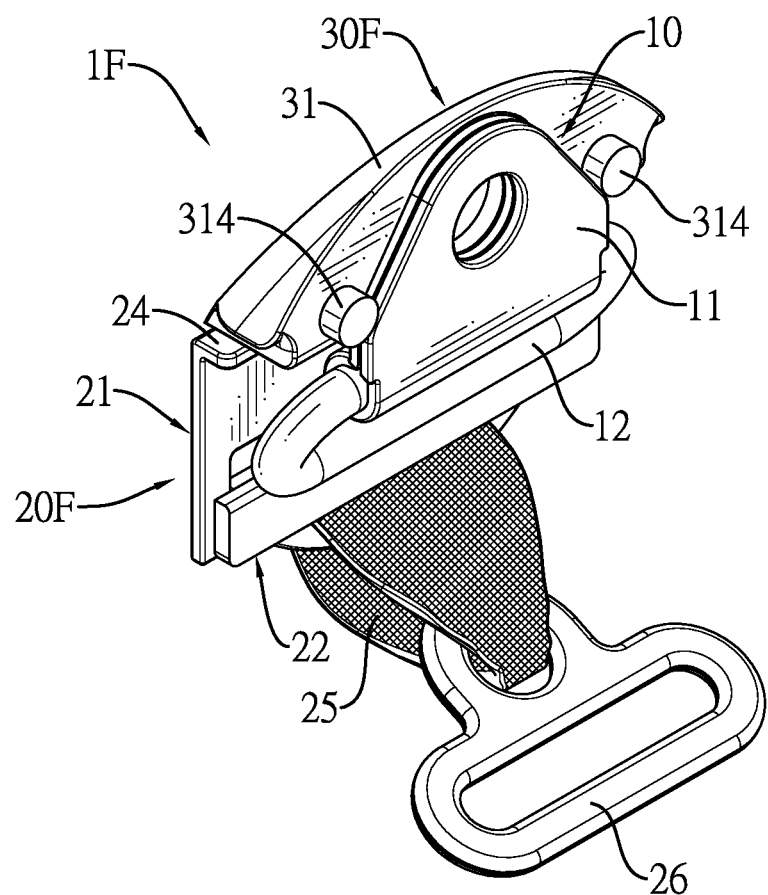
FIG. 17 is another perspective view of the webbing height adjustment device in FIG. 16.
Figure 18:
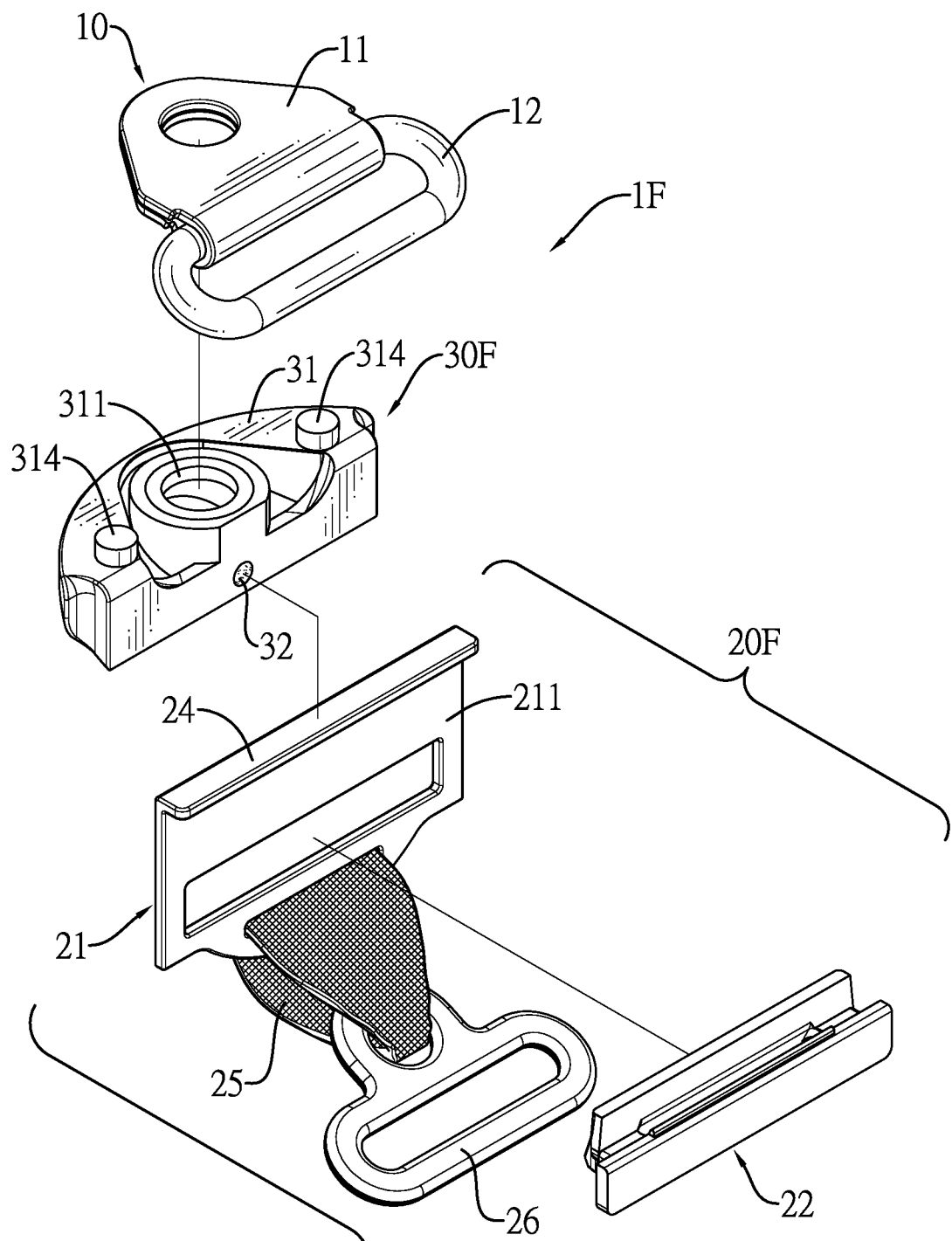
FIG. 18 is an exploded perspective view of the webbing height adjustment device in FIG. 17.

With reference to FIGS. 16 to 18, in the sixth embodiment of the webbing height adjustment device 1F, the webbing height adjustment device 1F has the top ring member 10, the locking assembly 20F, and the positioning member 30F. Structures of the top ring member 10, the locking assembly 2 and the positioning member 30F of the sixth embodiment of the webbing height adjustment device 1F are mostly similar to structures of the top ring member 10, the locking assembly 20E, and the positioning member 30E shown in the fifth embodiment of the webbing height adjustment device 1E. The locking assembly 20E, 20F can be selectively and magnetically attracted to the bottom end of the positioning member 30E, 30F disposed on the side surface of the top ring member 10 in the fifth embodiment and the sixth embodiment of the webbing height adjustment device 1E, 1F.

With reference to FIGS. 16 to 18, the difference between the fifth embodiment and the sixth embodiment of the webbing height adjustment device 1E, 1F is described as follows. In the positioning member 30F of the sixth embodiment of the webbing height adjustment device 1F, the two abutting rods 314 are disposed on and backwardly protrude out of the rear surface of the positioning element 31. The positioning element 31 and the retaining element 11 of the top ring member 10 are disposed on the central pillar of the vehicle by the threaded element 6. The positioning element 31 is fixed on the side surface of the retaining element 11. The abutting rods 314 abut against the retaining element 11 for preventing the locking assembly 20F and the positioning member 30F for oscillating relative to each other.

Operations of the fifth embodiment and the sixth embodiment of the webbing height adjustment device 1E, 1F are mostly the same and will not be described herein.

Figure 19:
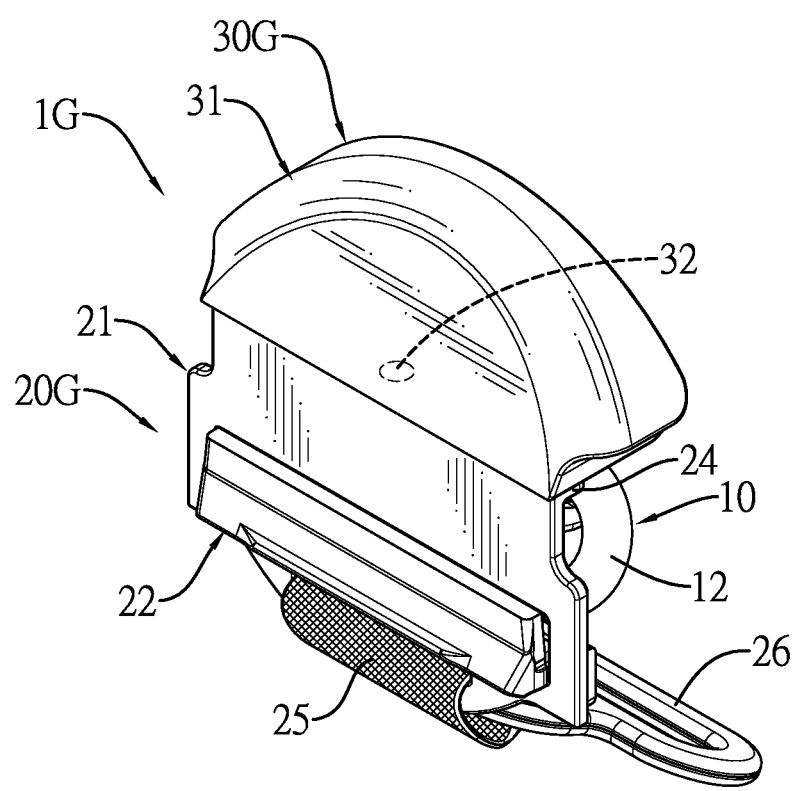
FIG. 19 is a perspective view of a seventh embodiment of a webbing height adjustment device in accordance with the present invention.

With reference to FIGS. 19 to 21, in a seventh embodiment of the webbing height adjustment device 1G, the webbing height adjustment device 1G has the top ring member 10, the locking assembly 20G, and the positioning member 30G. Structures of the top ring member 10, the locking assembly 20G, and the positioning member 30G of the seventh embodiment of the webbing height adjustment device 1G are mostly similar to structures of the top ring member 10, the locking assembly 20E, and the positioning member 30E shown in the fifth embodiment of the webbing height adjustment device 1E. The locking assembly 20E, 20G can be selectively and magnetically attracted to the bottom end of the positioning member 30E, 30G disposed on the side surface of the top ring member 10 in the fifth embodiment and the seventh embodiment of the webbing height adjustment device 1E, 1G.

With reference to FIGS. 19 to 21, the difference between the fifth embodiment and the seventh embodiment of the webbing height adjustment device 1E, 1G is described as follows. In the positioning member 30G of the seventh embodiment of the webbing height adjustment device 1G, the positioning element 31 does not have the central hole. The positioning element 31 has a recess 312 and a hook 313. The recess 312 is formed on the rear surface of the positioning element 31. The hook 313 is formed on the rear surface of the positioning element 31 and is located below the recess 312. The retaining element 11 of the top ring member 10 is disposed on the central pillar of the vehicle by the threaded element 6. The positioning element 31 is detachably disposed on the retaining element 11 of the top ring member 10. The retaining element 11 is embedded in the recess 312. The hook 313 hangs on and is connected to the bottom end of the retaining element 11 for positioning the positioning element 31 on the retaining element 11. The hook 313 replaces the assembling structure in the fifth embodiment of the webbing height adjustment device 1E about the positioning member 30E and the retaining element 11 that are disposed on the central pillar of the vehicle by the threaded element 6.

Operations of the fifth embodiment and the seventh embodiment of the webbing height adjustment device 1E, 1G are mostly the same and will not be described herein.

Figure 22:
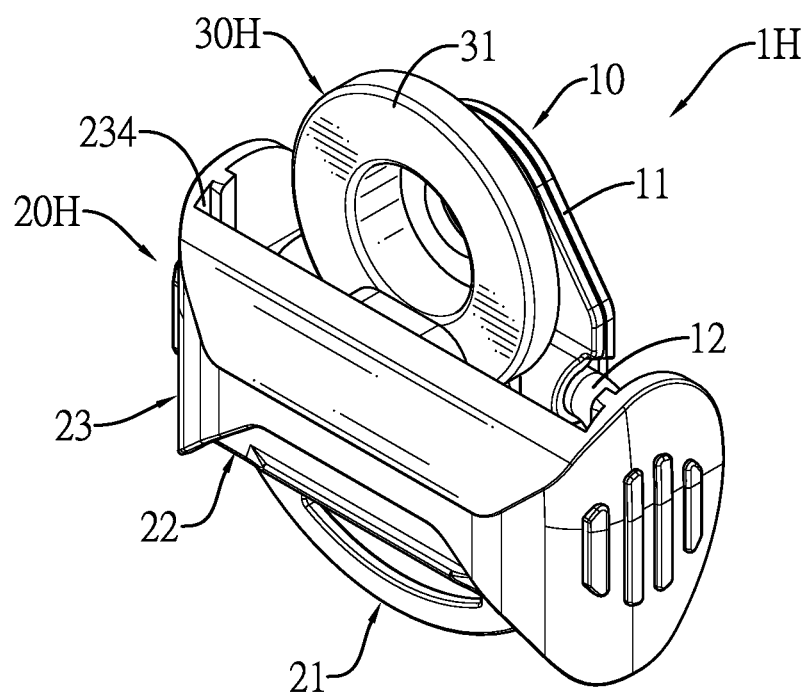
FIG. 22 is a perspective view of an eighth embodiment of a webbing height adjustment device in accordance with the present invention.
Figure 23:
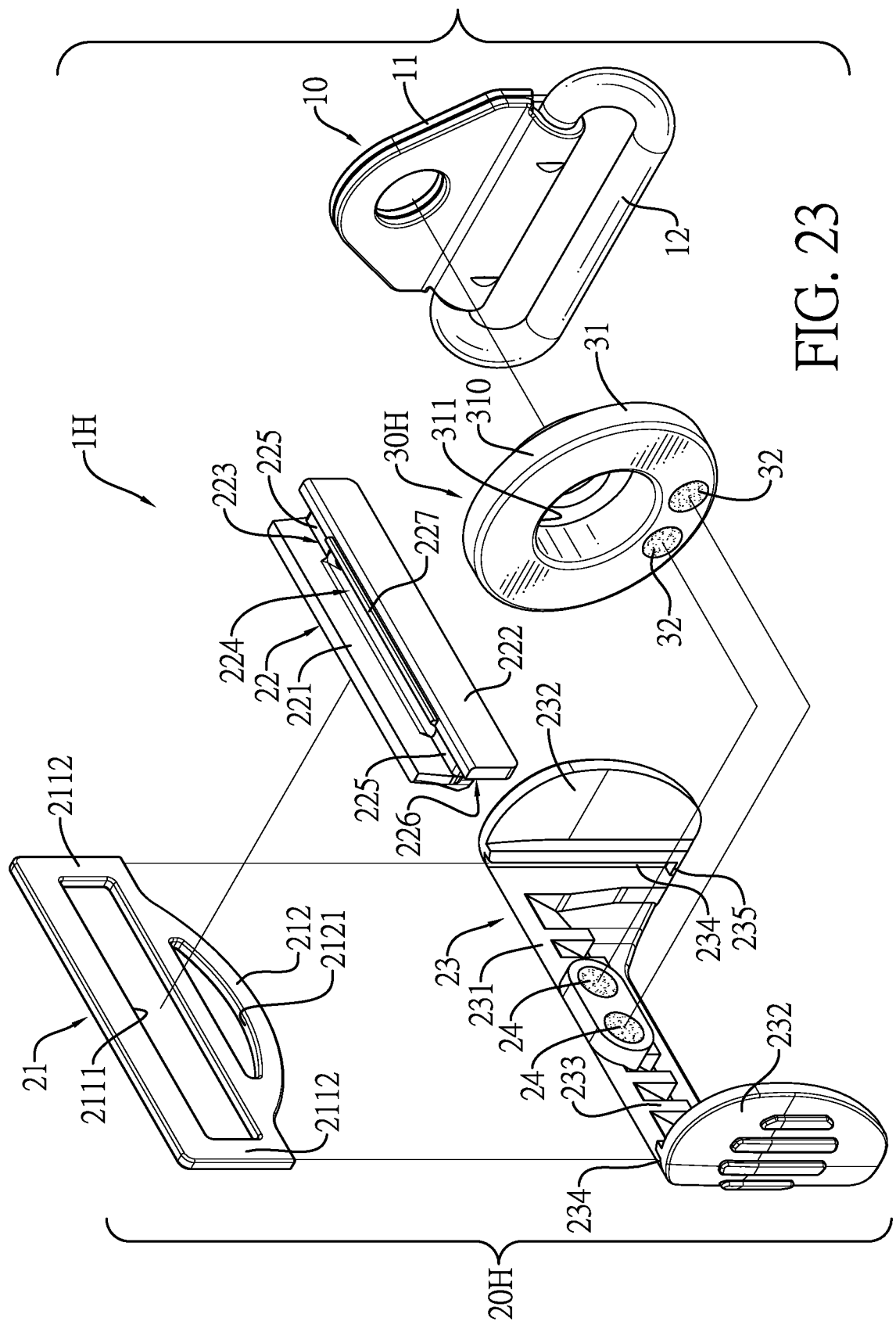
FIG. 23 is an exploded perspective view of the webbing height adjustment device in FIG. 22.

With reference to FIGS. 22 and 23, in an eighth embodiment of the webbing height adjustment device 1H, the webbing height adjustment device 1H has the top ring member 10, the locking assembly 20H, and the positioning member 30H. Structure of the eighth embodiment of the webbing height adjustment device 1H is mostly similar to structure of the first embodiment of the webbing height adjustment device 1A. Structures of the top ring member 10 of the eighth embodiment of the webbing height adjustment device 1H are same to structure of the top ring member 10 shown in the first embodiment of the webbing height adjustment device 1A. The top ring member 10 is fixed on the central pillar of the vehicle. The webbing 2 located beside or behind the seat is passed through the top ring 12. The locking assembly 20H and the positioning member 30H are changed.

With reference to FIGS. 22 and 23, the locking assembly 20H is moveably disposed outside the side surface of the top ring member 10 for locking or unlocking the sections of the webbing 2 located at two sides of the top ring 12. The locking assembly 20H has the frame 21, the slider 22, and a cover 23. The frame 21 and the slider 22 of the eighth embodiment of the webbing height adjustment device 1H are substantially the same to the frame 21 and the slider 22 of the first embodiment of the webbing height adjustment device 1A, and will not be described herein. The slider 22 is moveably disposed in the frame 21. The webbing 2 is directly passed through the connecting portion 212 of the frame 21. In addition, the connecting portion 212 is connected to the connecting strap 25. The connecting strap 25 is connected to the connecting element 26. The webbing 2 is passed through the connecting element 26, The connecting portion 212 of the frame 21 is indirectly connected to the webbing 2 by the connecting strap 25 and the connecting element 26 in series connection.

With reference to FIGS. 22 and 23, the frame 21 of the eighth embodiment of the webbing height adjustment device 1H cancels the structure of the positioning portion 24 of the frame 21 shown in the first embodiment of the webbing height adjustment device 1A. The cover 23 is added to the eighth embodiment of the webbing height adjustment device 1H. The positioning portion 24 is disposed on the cover 23.

With reference to FIGS. 22 and 23, the cover 23 is moveably disposed around and outside the frame 21 connected to the slider 22 for driving the slider 22 to move relative to the frame 21. The cover 23 has a covering base 231 and two covering side plates 232. The covering base 231 has two side surfaces and a back surface. The two covering side plates 232 are respectively formed on the two side surfaces of the covering base 231 and are opposite to each other. A space is formed between the two covering side plates 232 and is located behind the back surface of the covering base 231, The cover 23 has a top stop portion 233. The top stop portion 233 is formed on a top section of the back surface of the covering base 231. The positioning portion 24 is disposed on a back surface of the top stop portion 233. The positioning portion 24 is a permanent magnet or is made of paramagnetic materials or magnetic materials such as iron.

With reference to FIGS. 22 and 23, each one of the two covering side plates 232 has a top surface, a bottom surface, an inner surface, a guiding groove 234, and a bottom wall 235. The guiding groove 234 is formed on the inner surface of the covering side plate 232, extends to the top surface of the top surface of the covering side plate 232, and has a bottom. The bottom wall 235 is formed on the bottom surface of the covering side plate 232 and is located at the bottom of the guiding groove 234. The back surface of the covering base 231 of the cover 23 faces the first plate portion 221 of the slider 22. The two longitudinal side portions 2112 are respectively inserted into the guiding grooves 234 of the two covering side plates 232 in the cover 23. The frame 21 can be slid upwardly and downwardly in the cover 23 and is positioned by the bottom walls 235 located below the longitudinal side portions 2112. The top stop portion 233 formed on the top section of the back surface of the covering base 231 is located above the first plate portion 221 of the slider 22.

With reference to FIGS. 22 and 23, the positioning member 30H is disposed on the side surface of the retaining element 11 of the top ring member 10. The positioning member 30H and the top ring member 10 are fixed ort the central pillar of the vehicle. The positioning member 30H selectively and magnetically attracts the locking assembly 20H. The positioning member 30H has the positioning element 31 and the combining portion 32. The combining portion 32 is a permanent magnet, is disposed on the bottom section of a side surface of the positioning element 31, and attracts the positioning portion 24 on the cover 23. The locking assembly 20H is magnetically attracted to the positioning member 30H disposed on the side surface of the top ring member 10.

Figure 24:
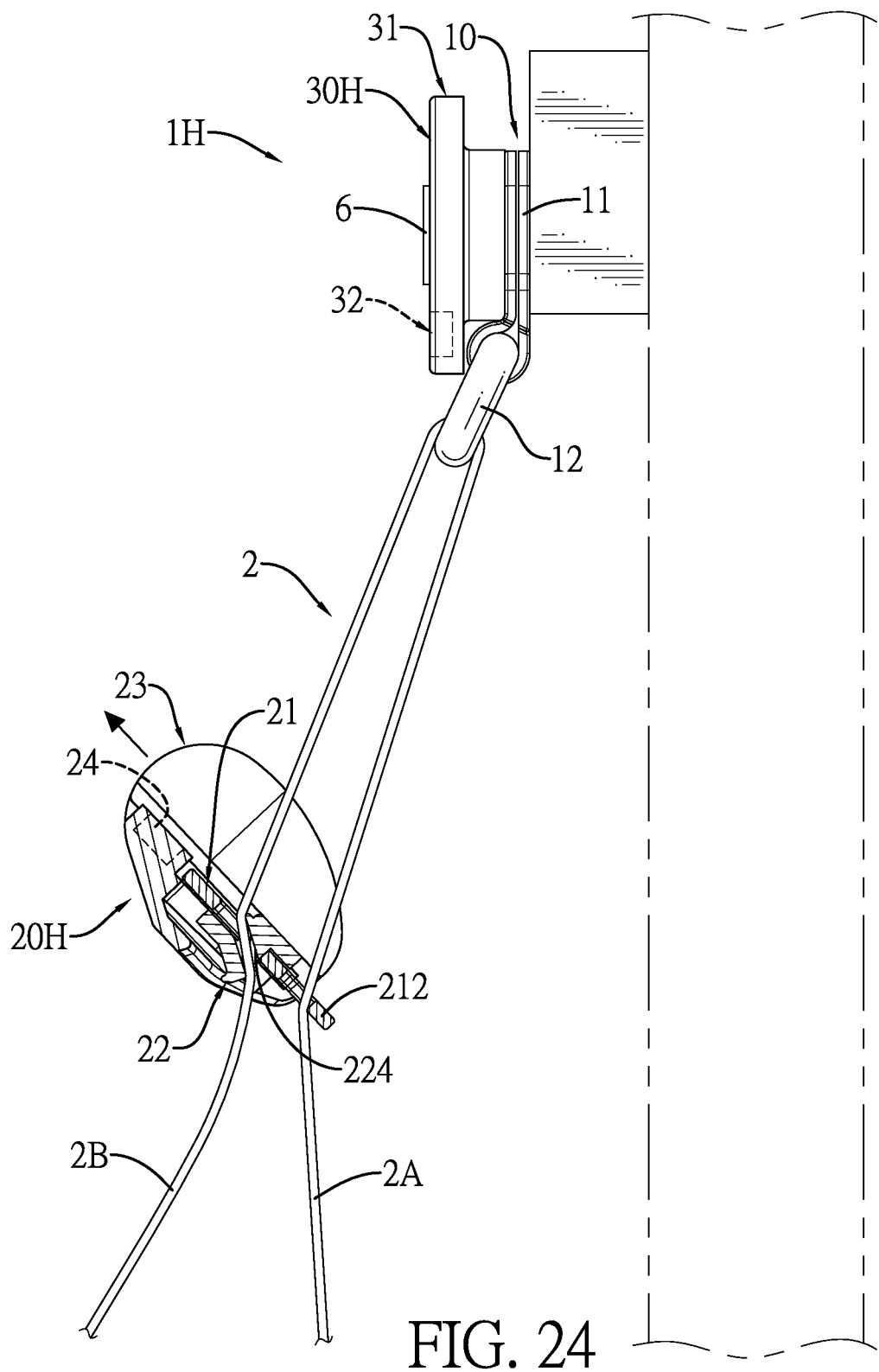
FIG. 24 is an operational front side view in partial section of the webbing height adjustment device in FIG. 22, showing a webbing is set in an unlocked state.

The eight embodiment of the webbing height adjustment device 1H is applied to the seat belt system in the vehicle. With reference to FIG. 24, the retaining element 11 of the top ring member 10 and the positioning member 30H are fixed on the central pillar of the vehicle by the threaded element 6. The webbing 2 is pulled from the retractor 3 located beside the seat and is passed through the connecting portion 212 of the frame 21. Then, the webbing 2 is passed through the top ring 12 of the top ring member 10 and the through slot 224 of the slider 22 located in the frame 21. The webbing 2 has the front section 2A and the rear section 2B. The front section 2A of the webbing 2 is defined between the top ring 12 and the retractor 3. The rear section 2B of the webbing 2 is connected to the front section 2A of the webbing 2 and is sequentially passed through the top ring 12, the cover 23, the frame 21, the slider 22, the tongue 4, and the retractor 3.

The occupant sits on the seat and the webbing 2 is fastened to abut the torso of the occupant. The tongue 4 connected to the rear section 2B is inserted into the buckle 5 located beside the seat. With reference to FIG. 24, in the eighth embodiment of the webbing height adjustment device 1H, the rear section 2B of the webbing 2 is locked or unlocked by the relative motion between the frame 21 and the slider 22. The webbing height adjustment device 1H forms the positioning sliding point between the front section 2A and the rear section 2B near the top ring member 10.

With reference to FIG. 24, the webbing height adjustment device 1H can be adjusted to be located at the height position of the positioning point of the webbing 2 by the occupant. The cover 23 can be held by one hand of the occupant. The relative motion between the frame 21 and the slider 22 is generated by the cover 23 for unlocking the rear section 21B of the webbing 2. The cover 23 is pushed upwardly or pulled downwardly. The eighth embodiment of the webbing height adjustment device 1H can be adjusted to a suitable position with continuously adjustment.

Figure 25:
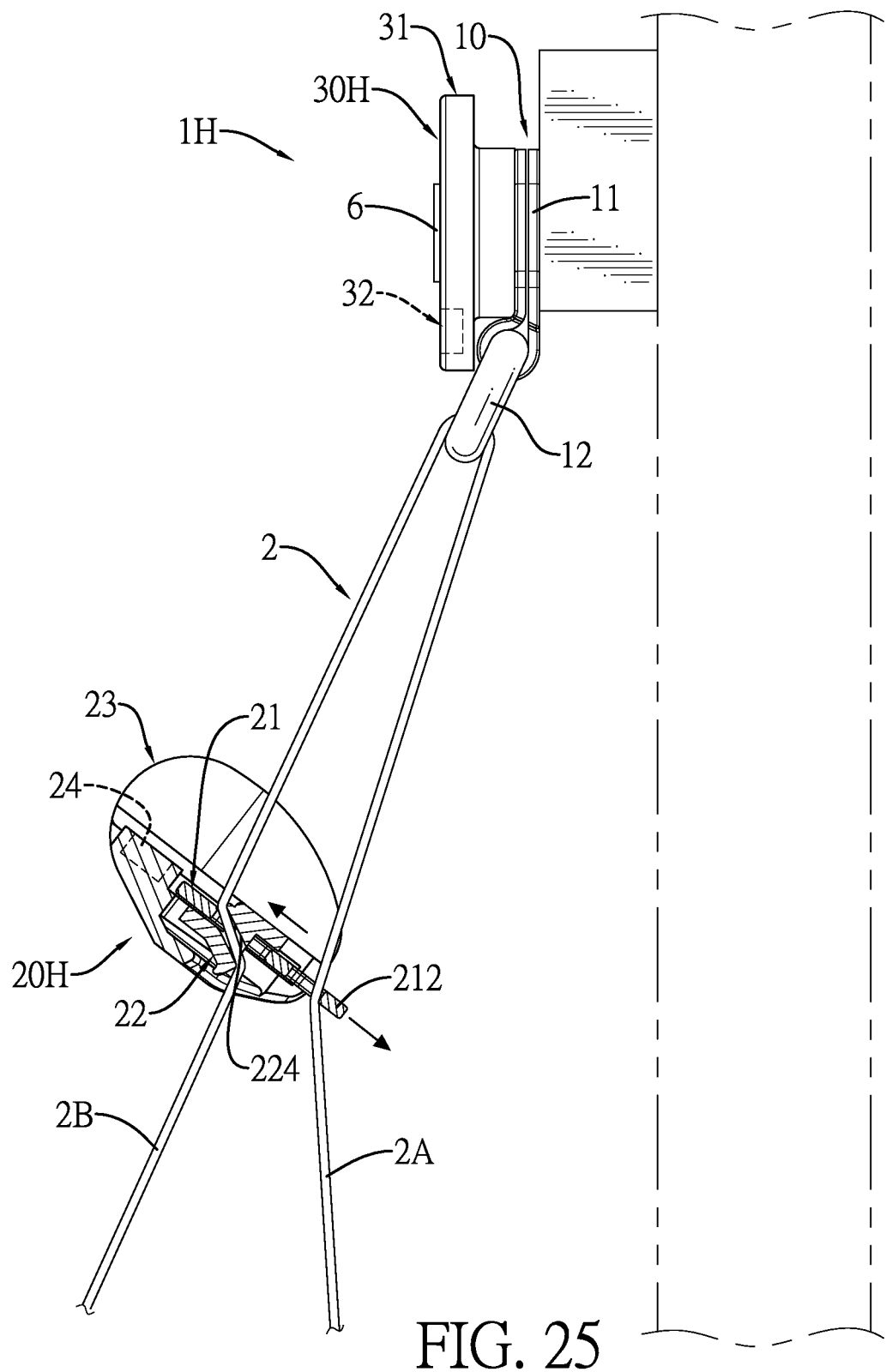
FIG. 25 is an operational front side view in partial section of the webbing height adjustment device in FIG. 22, showing the webbing is set in a locked state.

With reference to FIG. 25, the webbing height adjustment device 1H is released, and under the tension of the webbing 2, the frame 21 and the slider 22 relatively move to secure the rear section 2B. The webbing height adjustment device 1H generates sufficient friction to lock the webbing 2 automatically. The rear section 2B between the tongue 4 and the top ring member 10 is not allowed to move relative to the webbing height adjustment device 1H. After the height of the webbing height adjustment device 1H on the webbing 2 is adjusted upwardly or downwardly, the cover 23 can be released by the occupant. Under the tension of the webbing 2, the frame 21 and the slider 22 relatively move to secure the rear section 2B. The rear section 2B between the tongue 4 and the top ring member 10 is not allowed to move relative to the webbing height adjustment device 1H.

Figure 26:
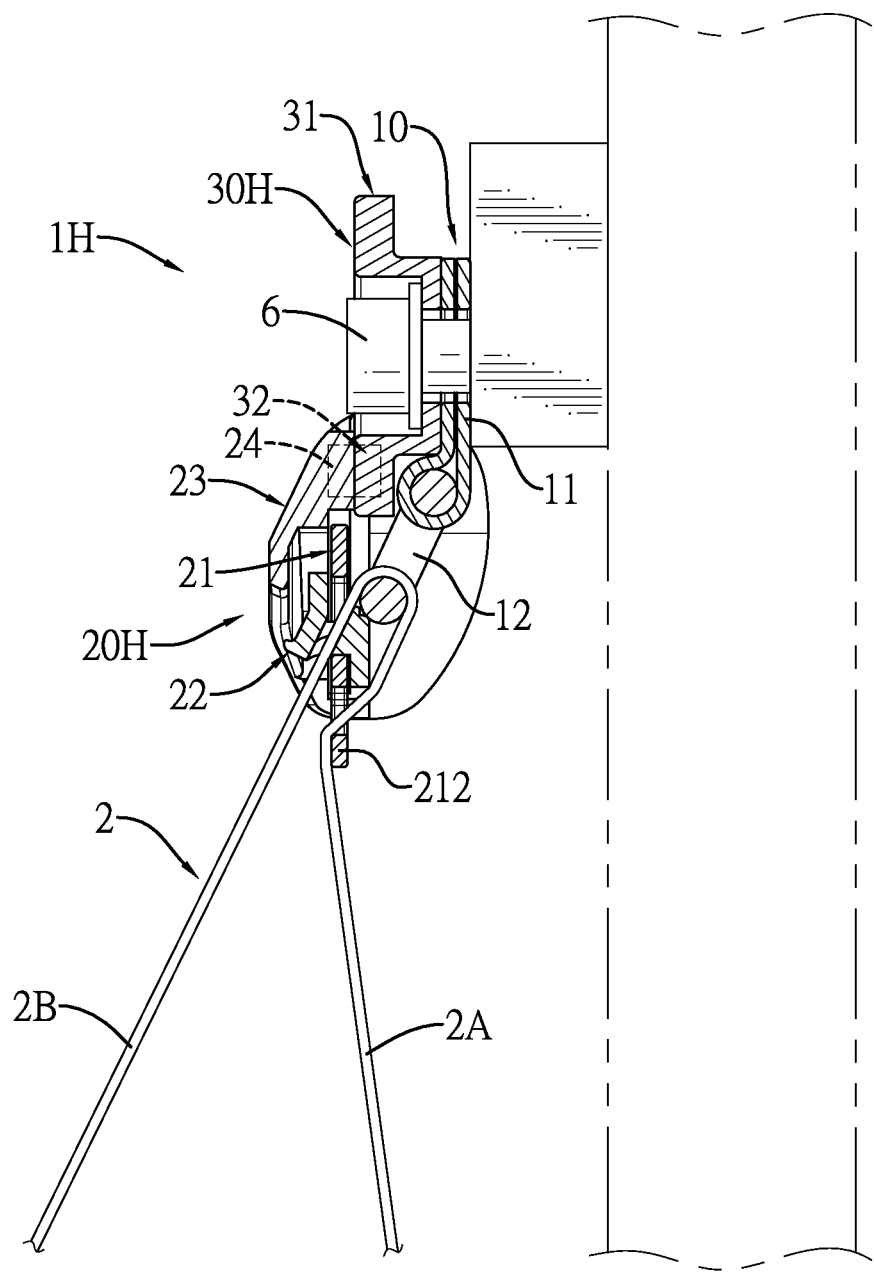
FIG. 26 is an operational front side view in partial section of the webbing height adjustment device in FIG. 22, showing a locking assembly is attracted to a positioning member.

With reference to FIG. 26, the eighth embodiment of the webbing height adjustment device 1H is not in use, or the height position of the positioning point of the webbing 2 is not in adjustment, the cover 23 is magnetically attracted to the positioning member 30H on the side surface of the top ring member 10. The frame 21 and the slider 22 in the cover 23 are unlocked relative to the webbing 2. The webbing 2 can be pulled freely.

Figure 27:
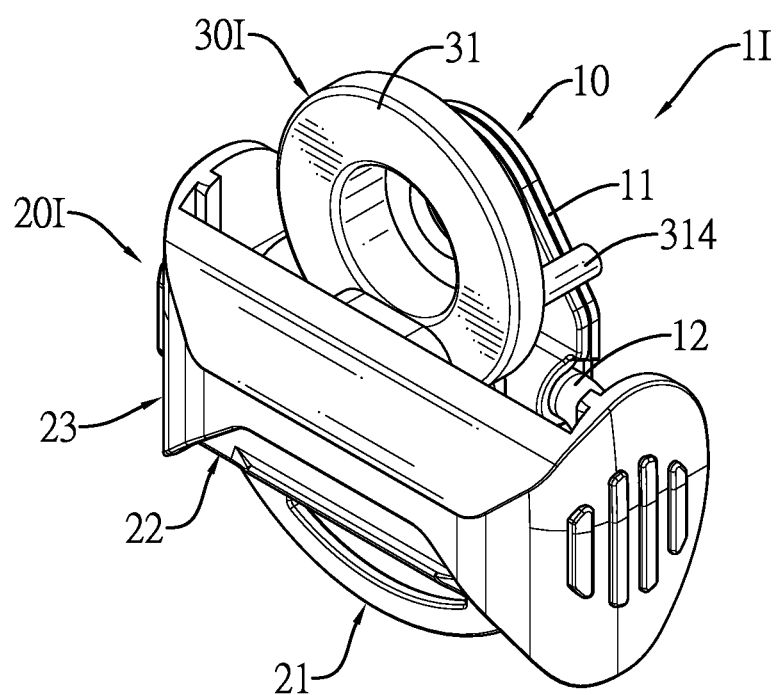
FIG. 27 is a perspective view of a ninth embodiment of a webbing height adjustment device in accordance with the present invention.
Figure 28:
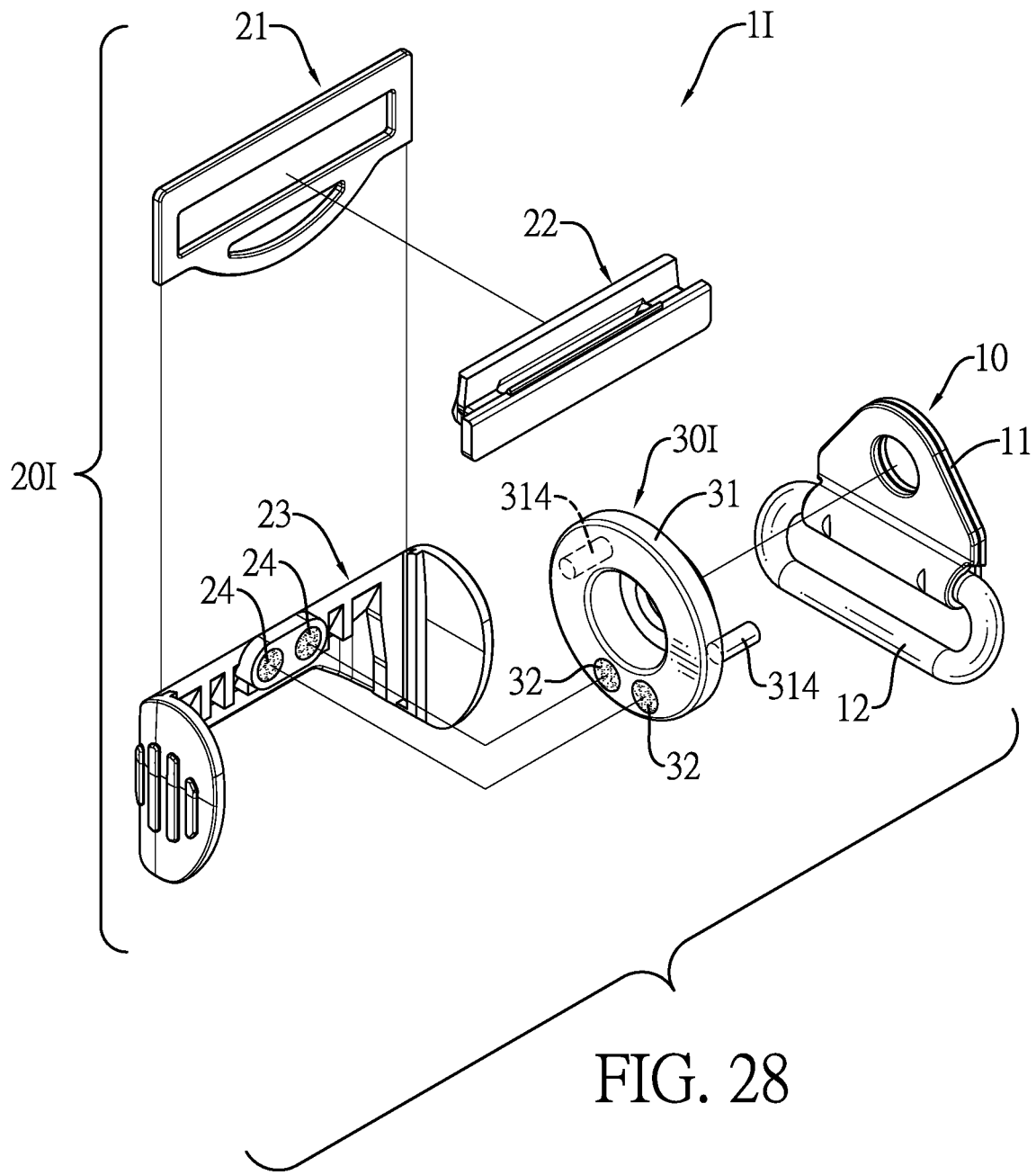
FIG. 28 is an exploded perspective view of the webbing height adjustment device in FIG. 27.

With reference to FIGS. 27 and 28, in a ninth embodiment of the webbing height adjustment device 1I, the webbing height adjustment device 1I has the top ring member 10, the locking assembly 20I, and the positioning member 30I. Structure of the ninth embodiment of the webbing height adjustment device 1I is mostly similar to structure of the eighth embodiment of the webbing height adjustment device 1H, and will not be described herein.

With reference to FIGS. 27 and 28, the difference in the eighth embodiment and the ninth embodiment of the webbing height adjustment device 1H, 1I is described as follows. In the ninth embodiment of the webbing height adjustment device 1I, the positioning member 30I has the two abutting rods 314 disposed on and backwardly protrude out of the rear surface of the base portion 310 of the positioning element 31. The positioning element 31 and the retaining element 11 of the top ring member 10 are disposed on the central pillar of the vehicle by the threaded element 6. The base portion 310 of the positioning member 31 is fixed on the side surface of the retaining element 11. The abutting rods 314 abut against the retaining element 11 for preventing the locking assembly 20I and the positioning member 30I from oscillating relative to each other.

Operation of the ninth embodiment of the webbing height adjustment device 1I is same to the operation of the eighth embodiment of the webbing height adjustment device 1H, and will not be described herein.

Figure 29:
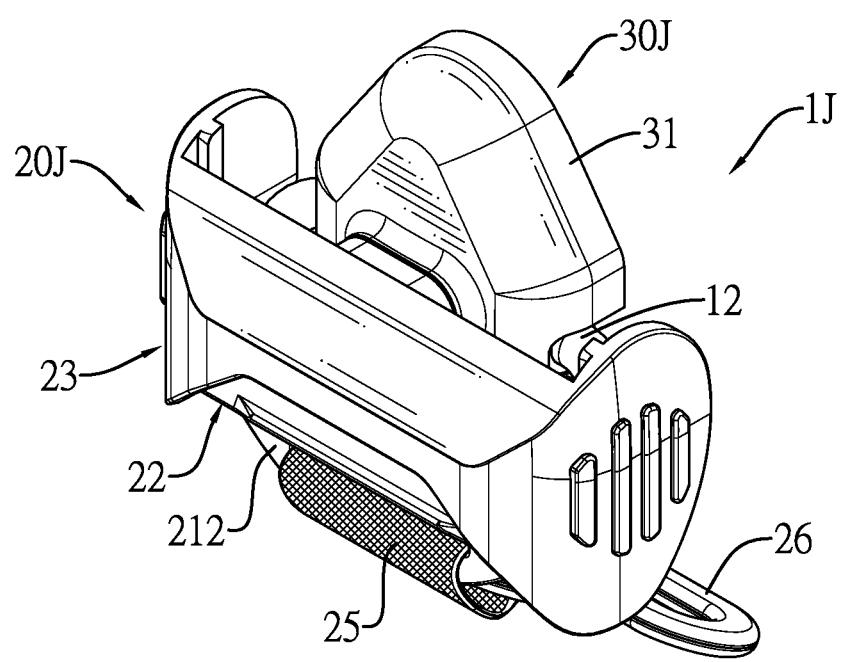
FIG. 29 is a perspective view of a tenth embodiment of a webbing height adjustment device in accordance with the present invention.
Figure 30:
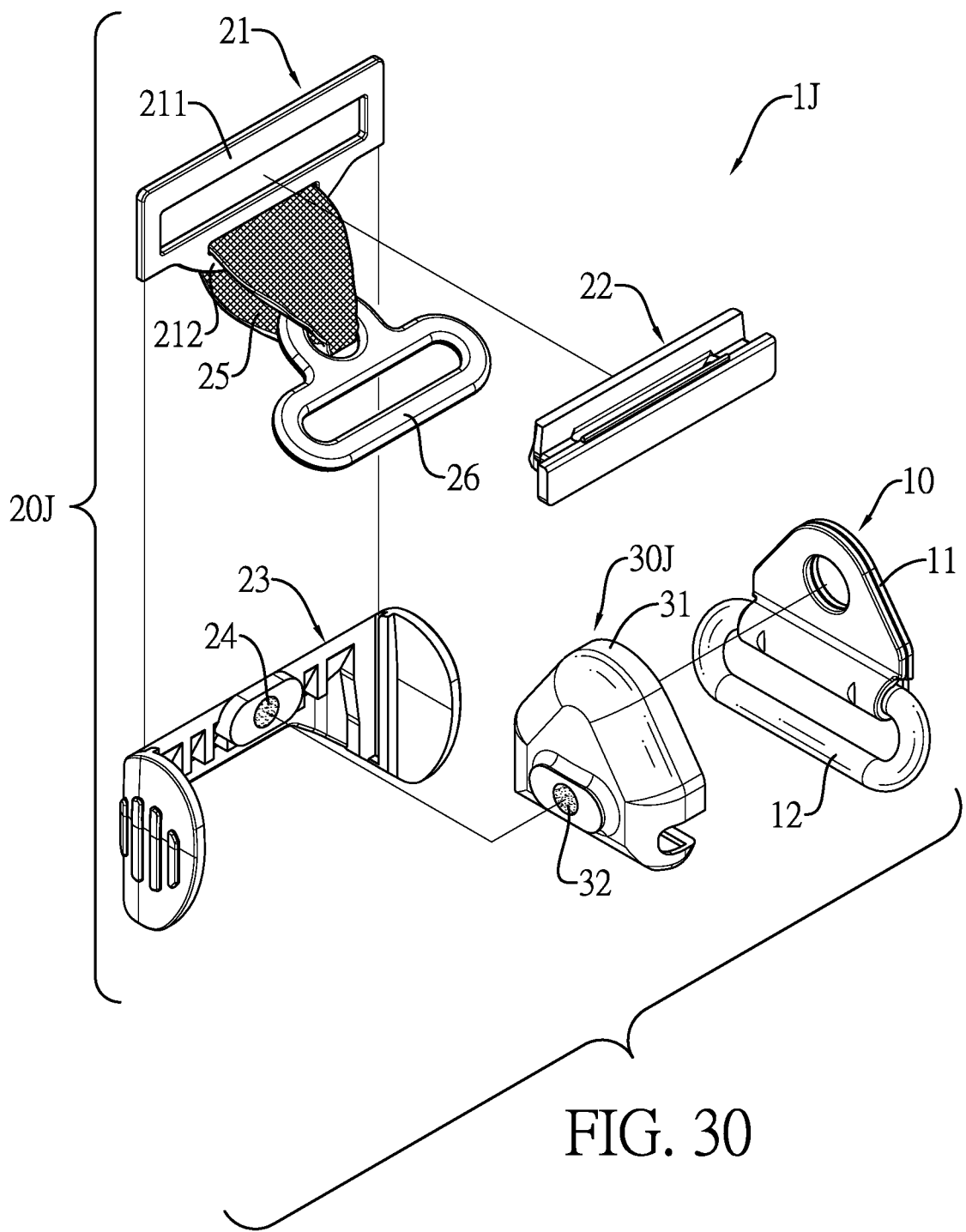
FIG. 30 is an exploded perspective view of the webbing height adjustment device in FIG. 29.

With reference to FIGS. 29 and 30, in a tenth embodiment of the webbing height adjustment device 1J, the webbing height adjustment device 1J has the top ring member 10, the locking assembly 20J, and the positioning member 30J. Structure of the tenth embodiment of the webbing height adjustment device 1J is mostly similar to structure of the ninth embodiment of the webbing height adjustment device 1I. The positioning element 31 is detachably disposed outside and around the retaining element 11 of the top ring member 10. Same parts between the ninth embodiment and the tenth embodiment of the webbing height adjustment device 1I, 1J will not be described herein.

The difference between the ninth embodiment and the tenth embodiment of the webbing height adjustment device 1I, 1J is described as follows. In the tenth embodiment of the webbing height adjustment device IJ, the locking assembly 20J is selectively and magnetically attracted to the positioning member 30J disposed on the side surface of the top ring member 10, and is different to the locking assembly 20I shown in the ninth embodiment of the webbing height adjustment device 1I.

With reference to FIGS. 29 and 30, the positioning member 30J has a positioning element 31 and a combining portion 32 disposed on the bottom section of the side surface of the positioning element 31. The positioning portion 24 on the back surface of the cover 23 is a permanent magnet or is made of paramagnetic materials or magnetic materials such as iron. The positioning member 30J is disposed on the side surface of the retaining element 11 of the top ring member 10. The positioning member 30J and the top ring member 10 are fixed on the central pillar of the vehicle. The positioning member 30J selectively and magnetically attracts the locking assembly 20J for positioning. The positioning member 30J has the positioning element 31 and the combining portion 32. The positioning element 31 is detachably disposed outside and around the retaining element 11 of the top ring member 10. The combining portion 32 is a permanent magnet, is disposed on the bottom section of the side surface of the positioning element 31, and selectively and magnetically attracts the positioning portion 24 of the cover 23. The locking assembly 20J is magnetically attracted to the positioning member 30J disposed on the side surface of the top ring member 10.

Operation of the tenth embodiment of the webbing height adjustment device 1J is same to the operation of the ninth embodiment of the webbing height adjustment device 1I, and will not be described herein.

Figure 31:
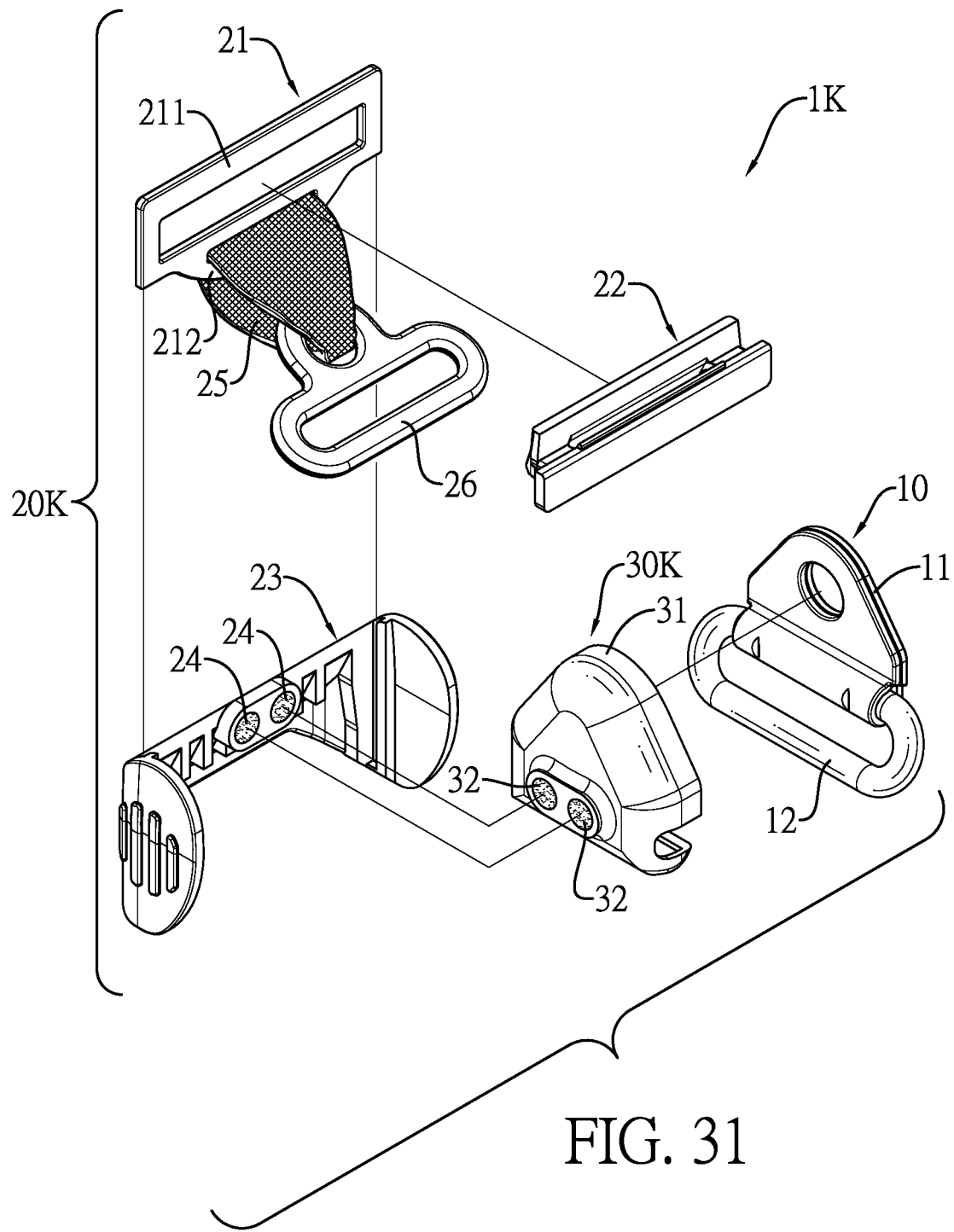
FIG. 31 is an exploded perspective view of an eleventh embodiment of a webbing height adjustment device in accordance with the present invention.

With reference to FIG. 31, in an eleventh embodiment of the webbing height adjustment device 1K, the webbing height adjustment device 1K has the top ring member 10, the locking assembly 20K, and the positioning member 30K. Structure of the eleventh embodiment of the webbing height adjustment device 1K is mostly similar to structure of the tenth embodiment of the webbing height adjustment device 1J. The difference between the tenth embodiment and the eleventh embodiment of the webbing height adjustment device 1J, 1K is described as follows.

In the eleventh embodiment of the webbing height adjustment device 1K, the positioning portion 24 can be made of paramagnetic materials or magnetic materials or is a magnet. The combining portion 32 is a permanent magnet. The amount of the positioning portion 24 disposed on the back surface of the cover 23 is increased. The amount of the combining portion 32 of the positioning member 30K, is increased. The magnetic force between the positioning portion 24 and the combining portion 32 is increased for preventing the locking assembly 20K and the positioning member 30K from oscillating relative to each other.

Operation of the eleventh embodiment of the webbing height adjustment device 1K is same to the operation of the tenth embodiment of the webbing height adjustment device 1J, and will not be described herein.

Figure 32:
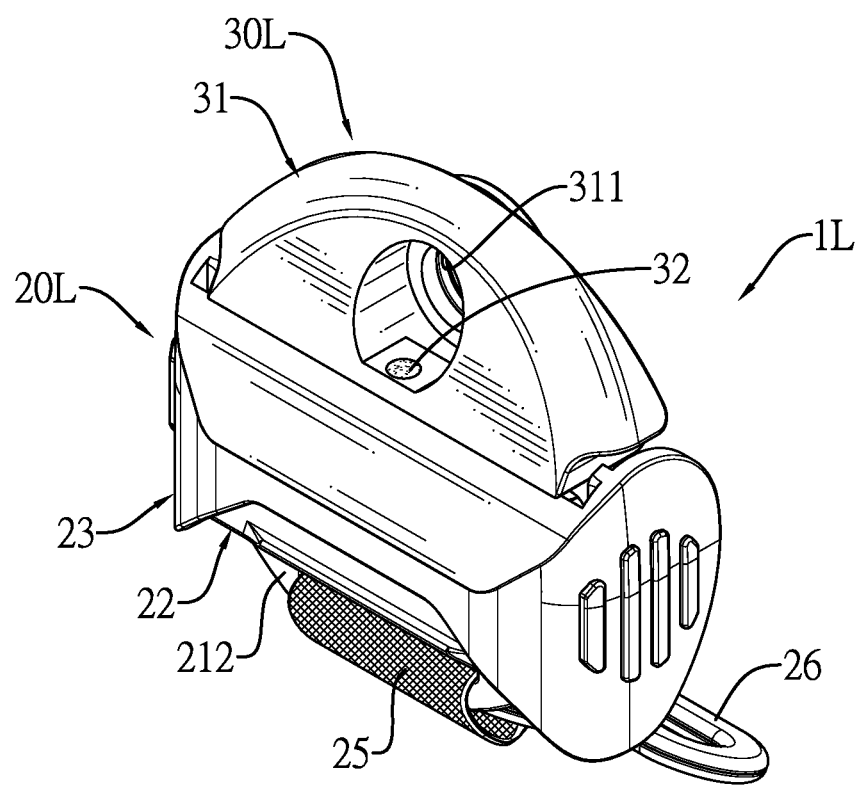
FIG. 32 is a perspective view of a twelfth embodiment of a webbing height adjustment device in accordance with the present invention.
Figure 33:
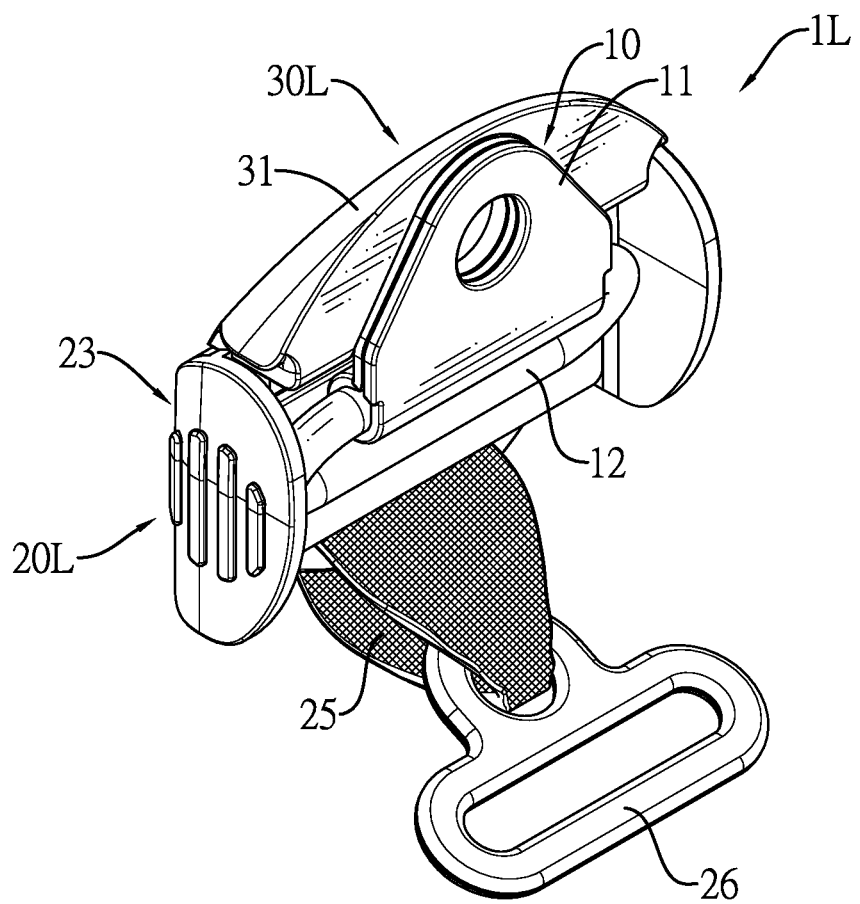
FIG. 33 is another perspective view of the webbing height adjustment device in FIG. 32.
Figure 34:
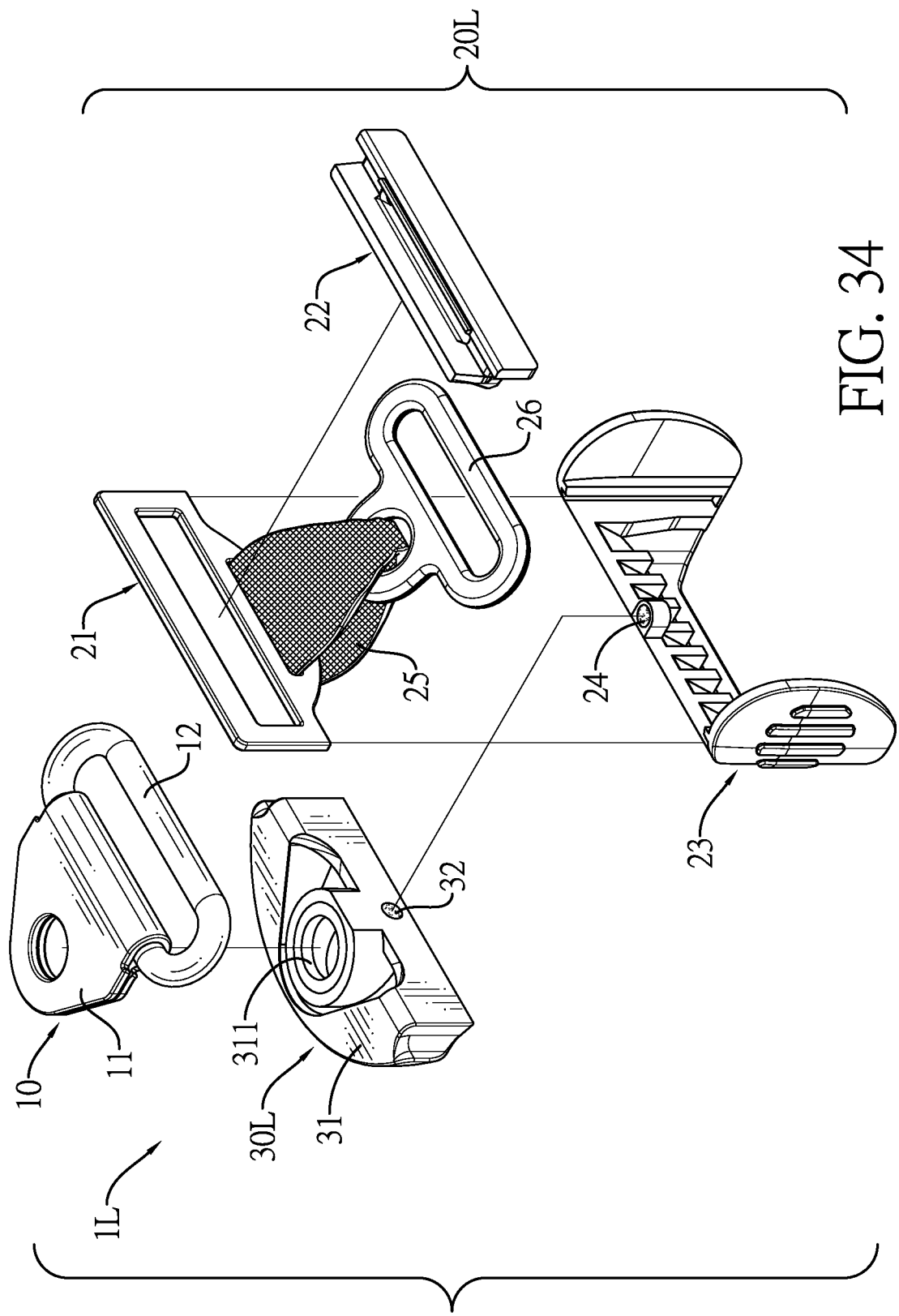
FIG. 34 is an exploded perspective view of the webbing height adjustment device in FIG. 32.

With reference to FIGS. 32 to 34, in a twelfth embodiment of the webbing height adjustment device 1L, the webbing height adjustment device 1L has the top ring member 10, the locking assembly 20L, and the positioning member 30L. Structures of the top ring member 10, the locking assembly 20L, and the positioning member 30L of the twelfth embodiment of the webbing height adjustment device 1L are mostly similar to structures of the top ring member 10, the locking assembly 20H, and the positioning member 30H shown in the eighth embodiment of the webbing height adjustment device 1H. The locking assemblies 20H, 20L attract the positioning members 30H, 30L disposed on the top ring members 10 shown in the eighth embodiment and the twelfth embodiment selectively and magnetically, The difference between the eighth embodiment and the twelfth embodiment of the webbing height adjustment device 1H, 1L is in assembly of the positioning portion 24 and positioning member 30L.

With reference to FIGS. 32 and 34, in the twelfth embodiment of the webbing height adjustment device 1L, the positioning portion 24 on the cover 23 is a permanent magnet or is made of paramagnetic materials or magnetic materials such as iron for magnetic attraction. The positioning member 30L has a positioning element 31 and a combining portion 32. The positioning element 31 has the central hole 311. The positioning element 31 is disposed on the side surface of the retaining element 11 of the top ring member 11 and is fixed on the central pillar of the vehicle by a threaded element 6. The combining portion 32 is a permanent magnet, is disposed on the bottom end of the positioning element, and selectively and magnetically attracts the positioning portion 24 on the back surface of the cover 23. The locking assembly 20L can be attracted to the bottom end of the positioning member 30L disposed on the side surface of the top ring member 10. Operation of the twelfth embodiment of the webbing height adjustment device 1L is the same to the operation of the eighth embodiment of the webbing height adjustment device 1H, and will not be described herein.

Figure 35:
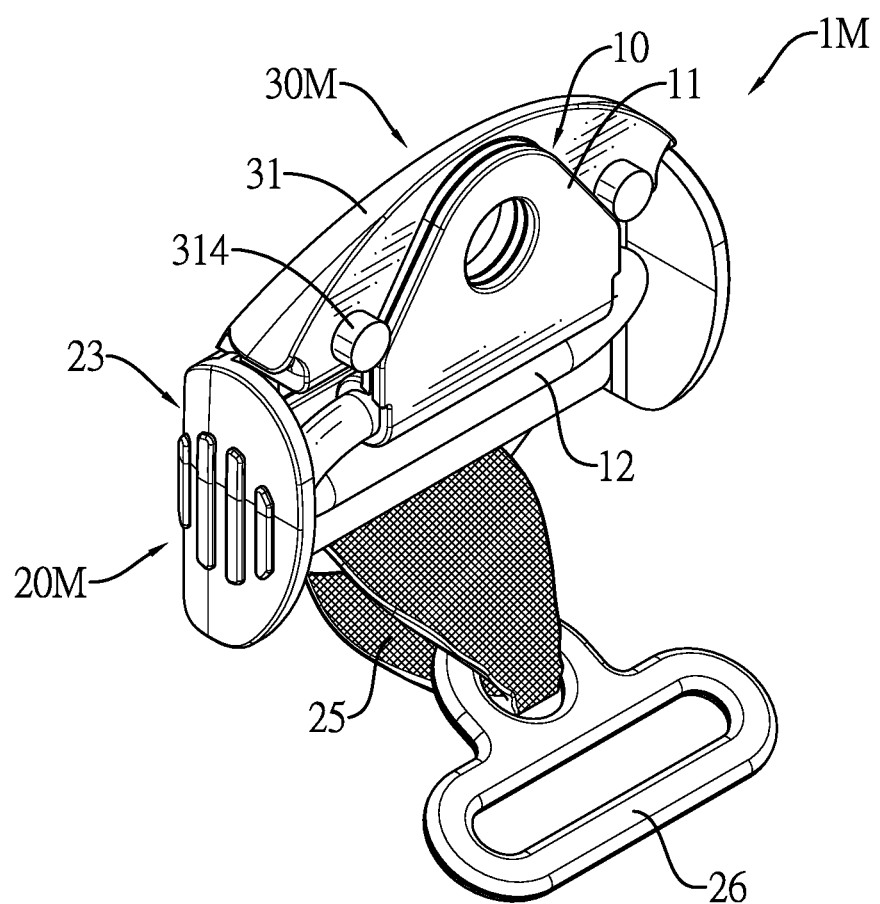
FIG. 35 is a perspective view of a thirteenth embodiment of a webbing height adjustment device in accordance with the present invention.

With reference to FIG. 35, in a thirteenth embodiment of the webbing height adjustment device 1M, the webbing height adjustment device 1M has the top ring member 10, the locking assembly 20L, and the positioning member 30L. Structures of the top ring member 10, the locking assembly 20M, and the positioning member 30M of the thirteenth embodiment of the webbing height adjustment device 1M are mostly similar to structures of the top ring member 10, the locking assembly 20L, and the positioning member 30L shown in the twelfth embodiment of the webbing height adjustment device 1L. The locking assemblies 20L, 20M selectively and magnetically attract the bottom end of the positioning members 30L, 30M disposed on the side surface of the top ring members 10 shown in the twelfth embodiment and the thirteenth embodiment.

With reference to FIG. 35, the difference between the twelfth embodiment and the thirteenth embodiment of the webbing height adjustment device 1L, 1M is described as follows. In the thirteenth embodiment of the webbing height adjustment device 1M, the positioning member 30M has two abutting rods 314 disposed on and backwardly protruding out of the rear surface of the positioning element 31. The positioning element 31 and the top ring member 10 are disposed on the central pillar of the vehicle by the threaded element 6. The positioning element 31 is fixed on the side surface of the retaining element 11. The two abutting rods 314 abut against the retaining element 11 for preventing the locking assembly 20M and the positioning member 30M from oscillating relative to each other.

Operation of the thirteenth embodiment of the webbing height adjustment device 1M is same to the operation of the twelfth embodiment of the webbing height adjustment device 1L, and will not be described herein.

Figure 36:
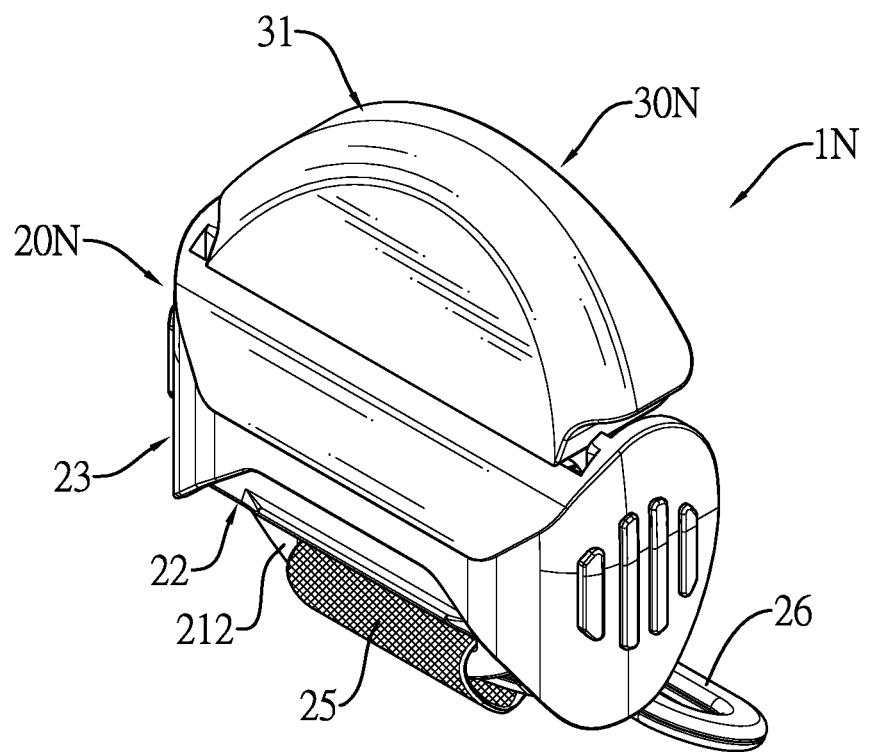
FIG. 36 is a perspective view of a fourteenth embodiment of a webbing height adjustment device in accordance with the present invention.
Figure 37:
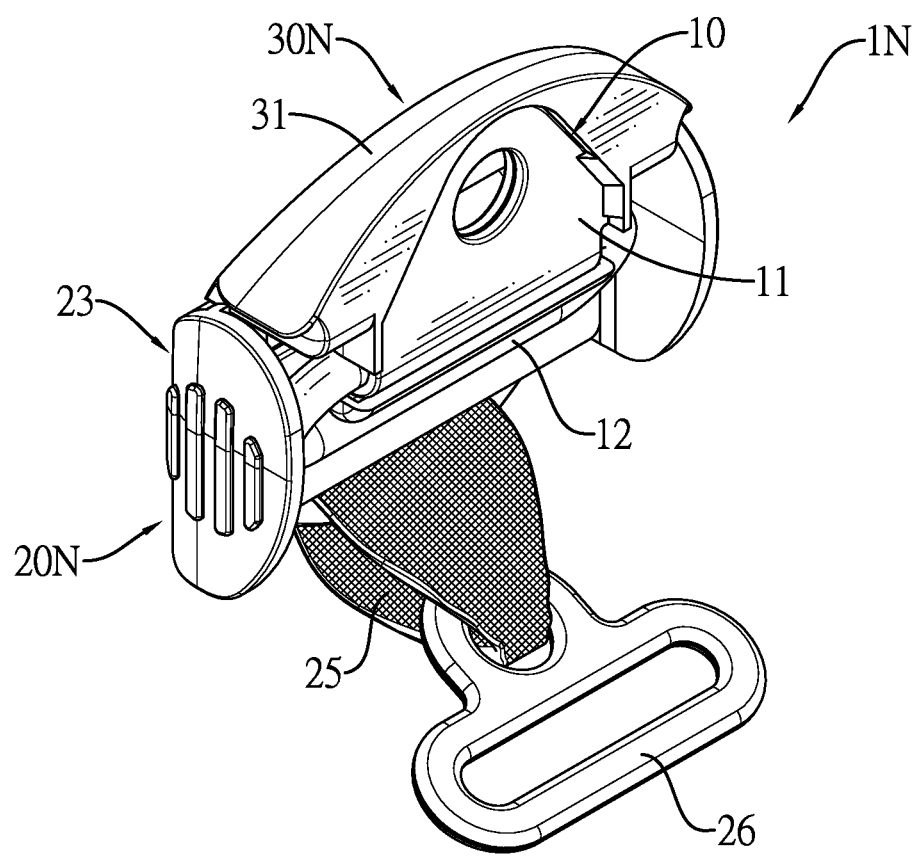
FIG. 37 is an exploded perspective view of the webbing height adjustment device in FIG. 36.
Figure 38:
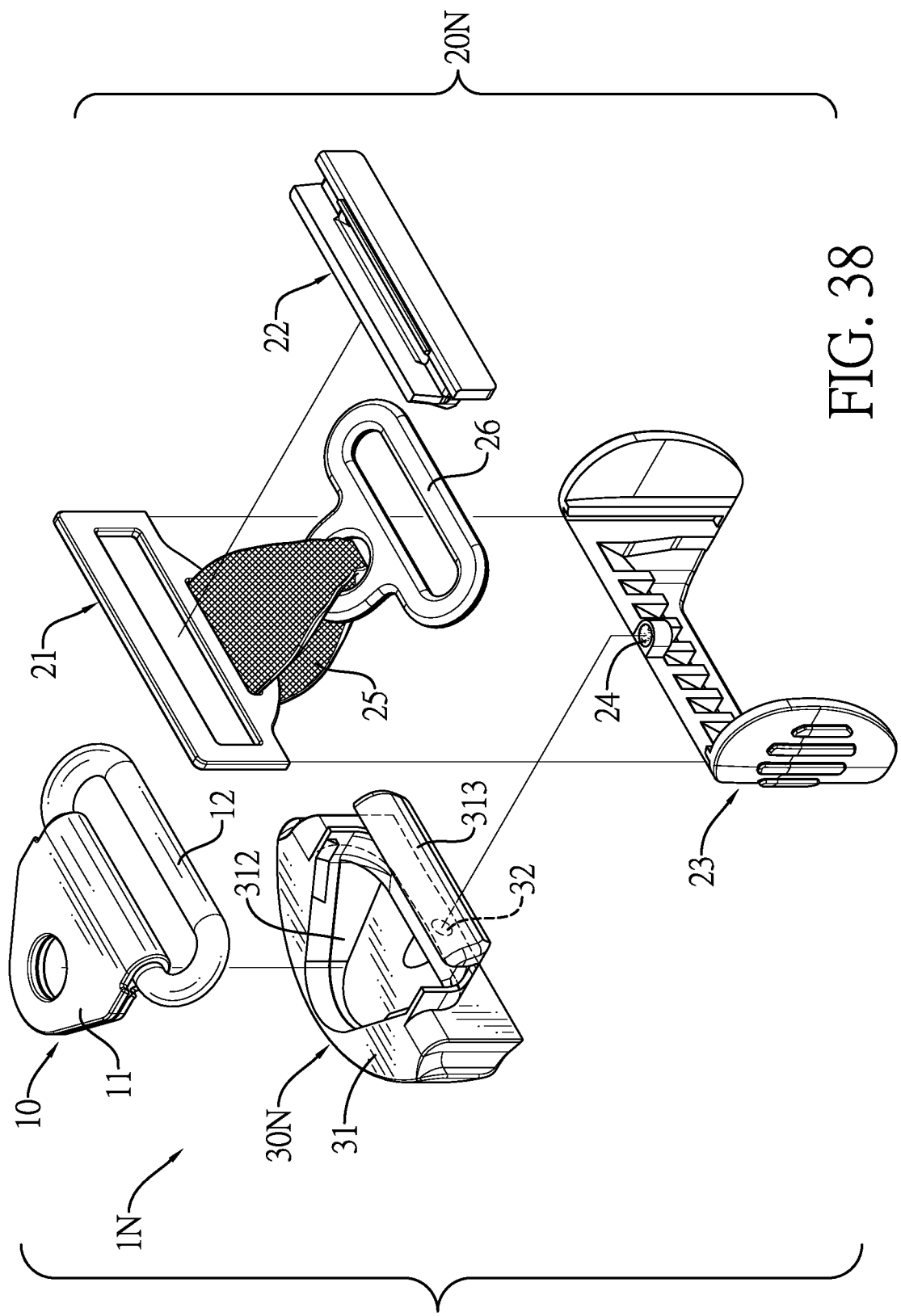
FIG. 38 is another exploded perspective view of the webbing height adjustment device in FIG. 36.

With reference to FIGS. 36 to 38, in a fourteenth embodiment of the webbing height adjustment device 1N, the webbing height adjustment device 1N has the top ring member 10, the locking assembly 20N, and the positioning member 30N. Structures of the top ring member 10, the locking assembly 20N, and the positioning member 30N of the fourteenth embodiment of the webbing height adjustment device 1N are mostly similar to structures of the top ring member 10, the locking assembly 20L, and the positioning member 30L shown in the twelfth embodiment of the webbing height adjustment device 1L. The locking assemblies 20L, 20N selectively and magnetically attract the bottom end of the positioning members 30L, 30N disposed on the side surface of the top ring members 10 shown in the twelfth embodiment and the fourteenth embodiment.

With reference to FIGS. 36 to 38, the difference between the twelfth embodiment and the fourteenth embodiment of the webbing height adjustment device 1L, 1N is described as follows. In the positioning member 30N of the fourteenth embodiment of the webbing height adjustment device 1N, the positioning element 31 does not have the central hole. The positioning element 31 has the recess 312 and the hook 313. The recess 312 is formed on the rear surface of the positioning element 31. The hook 313 is formed on the rear surface of the positioning element 31 and is located below the recess 312. The retaining element 11 of the top ring member 10 is disposed on the central pillar of the vehicle by the threaded element 6. The positioning element 31 is detachably disposed on the retaining element 11 of the top ring member 10. The retaining element 11 is embedded in the recess 312. The hook 313 hangs on and is connected to the bottom end of the retaining element 11 for positioning the positioning element 31 on the retaining element 11. The hook 313 replaces the assembling structure in the twelfth embodiment of the webbing height adjustment device 1L about the positioning member 301, and the retaining element 11 that are disposed on the central pillar of the vehicle by the threaded element 6.

Operation of the fourteenth embodiment of the webbing height adjustment device 1N is same to the operation of the twelfth embodiment of the webbing height adjustment device 1L, and will not be described herein.

Accordingly, the webbing height adjustment device 1A, 1B, 1C, 1D, 1E, 1F, 1G, 1H, 1I, 1J, 1K, 1L, 1M, 1N can be applied to the seat belt system in the vehicle. The height position of the top positioning point on the webbing 2 can be adjusted continuously by the webbing height adjustment device 1A, 1B, 1C, 1D, 1E, 1F, 1G, 1H, 1I, 1J, 1K, 1L, 1M, 1N. The webbing height adjustment device 1A, 1B, 1C, 1D, 1E, 1F, 1G, 1H, 1I, 1J, 1K, 1L, 1M, 1N is easy to operate and automatically locks the webbing 2. When the webbing height adjustment device 1A, 1B, 1C, 1D, 1E, 1F, 1G, 1H, 1I, 1J, 1K, 1L, 1M, 1N is not in use, the locking assembly 20A, 20B, 20C, 20D, 20E, 20F, 20G, 20H, 20I, 20J, 20K, 20L, 20M, 20N can be moved automatically and upwardly by the retracted webbing 2 and magnetically attracted to the positioning member 30A, 30B, 30C, 30D, 30E, 30F, 30G, 30H, 30I, 30J, 30K, 30L, 30M, 30N disposed on the side surface of the top ring member 10. The webbing height adjustment device can be retracted above the central pillar to save space. The webbing can be pulled freely under an unlocked status.

What is claimed is:

1. A webbing height adjustment device being applied to connect to a webbing of a seat belt system, the webbing height adjustment device comprising:
   a top ring member having
      a side surface;
      a retaining element having a bottom end; and
      a top ring connected to the bottom end of the retaining element, wherein the webbing passes through the top ring;
   a locking assembly moveably disposed outside the top ring member and having
      a frame disposed outside the top ring member and having
         a body disposed outside the top ring member and having
            a bottom end;
            a through hole formed through the body;
            two sides; and
            two longitudinal side portions respectively disposed at the two sides of the body; and
         a connecting portion formed on the bottom end of the body and having a connecting hole formed on the connecting portion, wherein the connecting portion is connected to a section of the webbing; and
      a slider moveably disposed in the body of the frame, and having
         two sides;
         a first plate portion disposed at one of the two sides of the slider;
         a second plate portion disposed at the other one of the two sides of the slider and opposite to the first plate portion;
         an insertion portion formed between the first plate portion and the second plate portion, and having
            a through slot formed through the insertion portion, wherein another section of the webbing is inserted through the through slot, and the section of the webbing inserted through the through slot is locked or unlocked by a relative motion between the frame and the slider; and
   a positioning member disposed on the top ring member, clutched with the locking assembly, and having
      a positioning element disposed on the top ring member; and
      at least one combining portion disposed on the positioning element and selectively and magnetically attracting the locking assembly for positioning.

2. The webbing height adjustment device as claimed in claim 1, wherein
   the frame is made of paramagnetic materials or magnetic materials;
   the body has a top end;
   the locking assembly has a positioning portion formed on and upwardly protruding out of the top end of the body;
   the positioning element is disposed on a side surface of the retaining element of the top ring member, and has a central hole formed through the positioning element, wherein a threaded element is inserted through the positioning element and the retaining element for positioning the positioning element and the retaining element; and
   each one of the at least one combining portion is a permanent magnet, is disposed on a bottom section of the positioning element, and selectively and magnetically attracts the positioning portion of the locking assembly, wherein the locking assembly is magnetically attracted to the positioning member disposed on the side surface of the top ring member.

3. The webbing height adjustment device as claimed in claim 2, wherein the positioning element has a rear surface and two abutting rods, the rear surface of the positioning element faces the top ring member, and the two abutting rods are disposed on the rear surface of the positioning element and abut against the retaining element for positioning.

4. The webbing height adjustment device as claimed in claim 1, wherein
   the frame is made of paramagnetic materials or magnetic materials;
   the body has a top end;
   the locking assembly has a positioning portion formed on and upwardly protruding out of the top end of the body;
   the positioning element disposed outside the retaining element of the top ring member; and
   the positioning member has multiple said combining portions, the multiple combining portions are permanent magnets, are disposed on a bottom section of the positioning element, and selectively and magnetically attracting the positioning portion of the frame, wherein the locking assembly is magnetically attracted to the positioning member disposed on the side surface of the top ring member.

5. The webbing height adjustment device as claimed in claim 1, wherein
the frame is made of paramagnetic materials or magnetic materials;
the body has a top end;
the locking assembly has a positioning portion formed on and bent backwardly from the top end of the body;
the positioning element disposed on a side surface of the retaining element of the top ring member, and having a bottom end and a central hole formed through the positioning element, Wherein a threaded element is inserted through the positioning element and the retaining element for positioning the positioning element and the retaining element; and
each one of the at least one combining portion is a permanent magnet, is disposed on the bottom end of the positioning element, and selectively and magnetically attracts the positioning portion of the locking assembly, wherein the locking assembly is magnetically attracted to the positioning member disposed on the side surface of the top ring member.

6. The webbing height adjustment device as claimed in claim 5, wherein the positioning element has a rear surface and two abutting rods, the rear surface of the positioning element faces the top ring member, and the two abutting rods are disposed on the rear surface of the positioning element and abut against the retaining element for positioning.

7. The webbing height adjustment device as claimed in claim 1, wherein
the frame is made of paramagnetic materials or magnetic materials;
the body has a top end;
the locking assembly has a positioning portion formed on and bent backwardly from the top end of the body;
the positioning element is disposed around and outside the top ring member, and has
a bottom end;
a rear surface;
a recess formed on the rear surface of the positioning element; and
a hook formed on the rear surface of the positioning element and located below the recess, wherein the retaining element is embedded in the recess, and the hook hangs on and is connected to the bottom end of the retaining element; and
each one of the at least one combining portion is a permanent magnet, is disposed on the bottom end of the positioning element, and selectively and magnetically attracts the positioning portion of the locking assembly, wherein the locking assembly is magnetically attracted to the positioning member disposed on the side surface of the top ring member.

8. The webbing height adjustment device as claimed in claim 1, wherein the connecting portion of the frame is connected to a connecting strap, the connecting strap is connected to a connecting element, and the webbing passes through the connecting element.

9. The webbing height adjustment device as claimed in claim 2, wherein the connecting portion of the frame is connected to a connecting strap, the connecting strap is connected to a connecting element, and the webbing passes through the connecting element.

10. The webbing height adjustment device as claimed in claim 3, wherein the connecting portion of the frame is connected to a connecting strap, the connecting strap is connected to a connecting element, and the webbing passes through the connecting element.

11. The webbing height adjustment device as claimed in claim 4, wherein the connecting portion of the frame is connected to a connecting strap, the connecting strap is connected to a connecting element, and the webbing passes through the connecting element.

12. The webbing height adjustment device as claimed in claim 5, wherein the connecting portion of the frame is connected to a connecting strap, the connecting strap is connected to a connecting element, and the webbing passes through the connecting element.

13. The webbing height adjustment device as claimed in claim 6, wherein the connecting portion of the frame is connected to a connecting strap, the connecting strap is connected to a connecting element, and the webbing passes through the connecting element.

14. The webbing height adjustment device as claimed in claim 7, wherein the connecting portion of the frame is connected to a connecting strap, the connecting strap is connected to a connecting element, and the webbing passes through the connecting element.

15. The webbing height adjustment device as claimed in claim 1, wherein
the first plate portion of the slider and the second plate portion vertically deviate from each other, the first plate portion has a top surface, a bottom section, and a bottom end, the second plate portion has a top surface, a top section, and a top end, and the top surface of the first plate portion is higher than the top surface of the second plate portion;
the insertion portion of the slider is formed between the bottom section of the first plate portion and the top section of the second plate portion, and has
two side walls disposed at two sides of the through slot, each one of the two side walls connected to the first plate portion and the second plate portion and having an outer surface; and
two slide slots respectively formed on the outer surfaces of the two side walls, each one of the two slide slots located between the first plate portion and the second plate portion, wherein two longitudinal side portions of the body are respectively inserted into the two slide slots; and
the through slot is sloped from the top end of the second plate portion toward the bottom end of the first plate portion and is located between the two side walls of the insertion portion.

16. The webbing height adjustment device as claimed in claim 2, wherein
the first plate portion of the slider and the second plate portion vertically deviate from each other, the first plate portion has a top surface, a bottom section, and a bottom end, the second plate portion has a top surface, a top section, and a top end, and the top surface of the first plate portion is higher than the top surface of the second plate portion;
the insertion portion of the slider is formed between the bottom section of the first plate portion and the top section of the second plate portion, and has two side walls disposed at two sides of the through slot, each one of the two side walls connected to the first plate portion and the second plate portion and having an outer surface; and two slide slots respectively formed on the outer surfaces of the two side walls, each one of the two slide slots located between the first plate portion and the second plate portion, wherein two longitudinal side portions of the body are respectively inserted into the two slide slots; and the through slot is sloped from the top end of the second plate portion toward the bottom end of the first plate portion and is located between the two side walls of the insertion portion.

17. The webbing height adjustment device as claimed in claim 3, wherein the first plate portion of the slider and the second plate portion vertically deviate from each other, the first plate portion has a top surface, a bottom section, and a bottom end, the second plate portion has a top surface, a top section, and a top end, and the top surface of the first plate portion is higher than the top surface of the second plate portion;

the insertion portion of the slider is formed between the bottom section of the first plate portion and the top section of the second plate portion, and has two side walls disposed at two sides of the through slot, each one of the two side walls connected to the first plate portion and the second plate portion and having an outer surface; and two slide slots respectively formed on the outer surfaces of the two side walls, each one of the two slide slots located between the first plate portion and the second plate portion, wherein two longitudinal side portions of the body are respectively inserted into the two slide slots; and the through slot is sloped from the top end of the second plate portion toward the bottom end of the first plate portion and is located between the two side walls of the insertion portion.

18. The webbing height adjustment device as claimed in claim 4, wherein the first plate portion of the slider and the second plate portion vertically deviate from each other, the first plate portion has a top surface, a bottom section, and a bottom end, the second plate portion has a top surface, a top section, and a top end, and the top surface of the first plate portion is higher than the top surface of the second plate portion;

the insertion portion of the slider is formed between the bottom section of the first plate portion and the top section of the second plate portion, and has two side walls disposed at two sides of the through slot, each one of the two side walls connected to the first plate portion and the second plate portion and having an outer surface; and two slide slots respectively formed on the outer surfaces of the two side walls, each one of the two slide slots located between the first plate portion and the second plate portion, wherein two longitudinal side portions of the body are respectively inserted into the two slide slots; and the through slot is sloped from the top end of the second plate portion toward the bottom end of the first plate portion and is located between the two side walls of the insertion portion.

19. The webbing height adjustment device as claimed in claim 5, wherein the first plate portion of the slider and the second plate portion vertically deviate from each other, the first plate portion has a top surface, a bottom section, and a bottom end, the second plate portion has a top surface, a top section, and a top end, and the top surface of the first plate portion is higher than the top surface of the second plate portion;

the insertion portion of the slider is formed between the bottom section of the first plate portion and the top section of the second plate portion, and has two side walls disposed at two sides of the through slot, each one of the two side walls connected to the first plate portion and the second plate portion and having an outer surface; and two slide slots respectively formed on the outer surfaces of the two side walls, each one of the two slide slots located between the first plate portion and the second plate portion, wherein two longitudinal side portions of the body are respectively inserted into the two slide slots; and the through slot is sloped from the top end of the second plate portion toward the bottom end of the first plate portion and is located between the two side walls of the insertion portion.

20. The webbing height adjustment device as claimed in claim 6, wherein the first plate portion of the slider and the second plate portion vertically deviate from each other, the first plate portion has a top surface, a bottom section, and a bottom end, the second plate portion has a top surface, a top section, and a top end, and the top surface of the first plate portion is higher than the top surface of the second plate portion;

the insertion portion of the slider is formed between the bottom section of the first plate portion and the top section of the second plate portion, and has two side walls disposed at two sides of the through slot, each one of the two side walls connected to the first plate portion and the second plate portion and having an outer surface; and two slide slots respectively formed on the outer surfaces of the two side walls, each one of the two slide slots located between the first plate portion and the second plate portion, wherein two longitudinal side portions of the body are respectively inserted into the two slide slots; and the through slot is sloped from the top end of the second plate portion toward the bottom end of the first plate portion and is located between the two side walls of the insertion portion.

21. The webbing height adjustment device as claimed in claim 7, wherein the first plate portion of the slider and the second plate portion vertically deviate from each other, the first plate portion has a top surface, a bottom section, and a bottom end, the second plate portion has a top surface, a top section, and a top end, and the top surface of the first plate portion is higher than the top surface of the second plate portion;

the insertion portion of the slider is formed between the bottom section of the first plate portion and the top section of the second plate portion, and has two side wails disposed at two sides of the through slot, each one of the two side walls connected to the first plate portion and the second plate portion and having an outer surface; and two slide slots respectively formed on the outer surfaces of the two side walls, each one of the two slide slots located between the first plate portion and the second plate portion, wherein two longitudinal side portions of the body are respectively inserted into the two slide slots; and the through slot is sloped from the top end of the second plate portion toward the bottom end of the first plate portion and is located between the two side walls of the insertion portion.

22. The webbing height adjustment device as claimed in claim 15, wherein the connecting portion of the frame is connected to a connecting strap, the connecting strap is connected to a connecting element, and the webbing passes through the connecting element.

23. The webbing height adjustment device as claimed in claim 16, wherein the connecting portion of the frame is connected to a connecting strap, the connecting strap is connected to a connecting element, and the webbing passes through the connecting element.

24. The webbing height adjustment device as claimed in claim 17, wherein the connecting portion of the frame is connected to a connecting strap, the connecting strap is connected to a connecting element, and the webbing passes through the connecting element.

25. The webbing height adjustment device as claimed in claim 18, wherein the connecting portion of the frame is connected to a connecting strap, the connecting strap is connected to a connecting element, and the webbing passes through the connecting element.

26. The webbing height adjustment device as claimed in claim 19, wherein the connecting portion of the frame is connected to a connecting strap, the connecting strap is connected to a connecting element, and the webbing passes through the connecting element.

27. The webbing height adjustment device as claimed in claim 20, wherein the connecting portion of the frame is connected to a connecting strap, the connecting strap is connected to a connecting element, and the webbing passes through the connecting element.

28. The webbing height adjustment device as claimed in claim 21, wherein the connecting portion of the frame is connected to a connecting strap, the connecting strap is connected to a connecting element, and the webbing passes through the connecting element.

29. The webbing height adjustment device as claimed in claim 1, wherein
the locking assembly has
a cover moveably disposed around and outside the frame connected to the slider for driving the slider to move relative to the frame, and having
a covering base having two side surfaces and a back surface; and
two covering side plates respectively formed on the two side surfaces of the covering base and opposite to each other;
the locking assembly has a positioning portion disposed on the back surface of the covering base and being a permanent magnet;
the positioning element is disposed on a side surface of the retaining element of the top ring member, and has a central hole formed through the positioning element, wherein a threaded element is inserted through the positioning element and the retaining element for positioning the positioning element and the retaining element; and
each one of the at least one combining portion is a permanent magnet, is disposed on a bottom section of the positioning element, wherein the positioning portion and the at least one combining portion magnetically attract each other for positioning the locking assembly on the positioning member disposed on the side surface of the top ring member.

30. The webbing height adjustment device as claimed in claim 29, wherein the positioning element has a rear surface and two abutting rods, the rear surface of the positioning element faces the top ring member, and the two abutting rods are disposed on the rear surface of the positioning element and abut against the retaining element for positioning.

31. The webbing height adjustment device as claimed in claim 1, wherein
the locking assembly has
a cover moveably disposed around and outside the frame for driving the slider to move relative to the frame, and having
a covering base having two side surfaces and a back surface; and
two covering side plates respectively formed on the two side surfaces of the covering base and opposite to each other;
the locking assembly has a positioning portion disposed on the back surface of the covering base and being a permanent magnet;
the positioning element is disposed outside the retaining element of the top ring member; and
each one of the at least one combining portion is a permanent and is disposed on a bottom section of the positioning element, wherein the positioning portion and the at least one combining portion magnetically attract each other from front to rear for positioning the locking assembly on the positioning member disposed on the side surface of the top ring member.

32. The webbing height adjustment device as claimed in claim 1, wherein
the locking assembly has
a cover moveably disposed around and outside the frame for driving the slider to move relative to the frame, and having
a covering base having two side surfaces and a back surface; and
two covering side plates respectively formed on the two side surfaces of the covering base and opposite to each other;
the locking assembly has a positioning portion disposed on the back surface of the covering base and being a permanent magnet;
the positioning element is disposed on a side surface of the retaining element of the top ring member, and has a central hole formed through the positioning element, wherein a threaded element is inserted through the positioning element and the retaining element for positioning the positioning element and the retaining element; and
each one of the at least one combining portion is a permanent magnet and is disposed on a bottom section of the positioning element, wherein the positioning portion and the at least one combining portion magnetically attract each other from top to bottom for positioning the locking assembly on the positioning member disposed on the side surface of the top ring member.

33. The webbing height adjustment device as claimed in claim 32, wherein the positioning element has a rear surface and two abutting rods, the rear surface of the positioning element faces the top ring member, and the two abutting rods are disposed on and protrude out of the rear surface of the positioning element and abut against the retaining element for positioning.

34. The webbing height adjustment device as claimed in claim 1, wherein
the locking assembly has
a cover moveably disposed around and outside the frame for driving the slider to move relative to the frame, and having
a covering base having two side surfaces and a back surface; and
two covering side plates respectively formed on the two side surfaces of the covering base and opposite to each other;
the locking assembly has a positioning portion disposed on the back surface of the covering base and being a permanent magnet;
the positioning element is disposed around and outside the top ring member, and having
a bottom end;
a rear surface;
a recess formed on the rear surface of the positioning element; and
a hook formed on the rear surface of the positioning element and located below the recess, wherein the retaining element is embedded in the recess, the hook hangs on and is connected to the bottom end of the retaining element; and
each one of the at least one combining portion is a permanent magnet and is disposed on the bottom end of the positioning element, wherein the positioning portion and the at least one combining portion magnetically attract each other from top to bottom for positioning the locking assembly on the positioning member disposed on the side surface of the top ring member.

35. The webbing height adjustment device as claimed in claim 29, wherein the connecting portion of the frame is connected to a connecting strap, the connecting strap is connected to a connecting element, and the webbing passes through the connecting element.

36. The webbing height adjustment device as claimed in claim 30, wherein the connecting portion of the frame is connected to a connecting strap, the connecting strap is connected to a connecting element, and the webbing passes through the connecting element.

37. The webbing height adjustment device as claimed in claim 31, wherein the connecting portion of the frame is connected to a connecting strap, the connecting strap is connected to a connecting element, and the webbing passes through the connecting element.

38. The webbing height adjustment device as claimed in claim 32, wherein the connecting portion of the frame is connected to a connecting strap, the connecting strap is connected to a connecting element, and the webbing passes through the connecting element.

39. The webbing height adjustment device as claimed in claim 33, wherein the connecting portion of the frame is connected to a connecting strap, the connecting strap is connected to a connecting element, and the webbing passes through the connecting element.

40. The webbing height adjustment device as claimed in claim 34, wherein the connecting portion of the frame is connected to a connecting strap, the connecting strap is connected to a connecting element, and the webbing passes through the connecting element.

41. The webbing height adjustment device as claimed in claim 29, wherein
the first plate portion of the slider and the second plate portion vertically deviate from each other, the first plate portion has a top surface, a bottom section, and a bottom end, the second plate portion has a top surface, a top section, and a top end, and the top surface of the first plate portion is higher than the top surface of the second plate portion;
the insertion portion of the slider is formed between the bottom section of the first plate portion and the top section of the second plate portion, and has
two side wails disposed at two sides of the through slot, each one of the two side walls connected to the first plate portion and the second plate portion and having an outer surface; and
two slide slots respectively formed on the outer surfaces of the two side walls, each one of the two slide slots located between the first plate portion and the second plate portion, wherein two longitudinal side portions of the body are respectively inserted into the two slide slots;
the through slot is sloped from the top end of the second plate portion toward the bottom end of the first plate portion and is located between the two side walls;
the cover has
a top stop portion formed on the back surface of the covering base; and
each one of the two covering side plates having
a top surface;
a bottom surface;
an inner surface;
a guiding groove formed on the inner surface of the covering side plate, extending to the top surface of the covering side plate, having a bottom; and
a bottom wall formed on the bottom surface of the covering side plate and located at the bottom of the guiding groove;
wherein two sides of the body of the frame are moveably inserted into the guiding grooves of the two covering side plates, and the top stop portion is located above the top surfaces of the two covering side plates.

42. The webbing height adjustment device as claimed in claim 30, wherein
the first plate portion of the slider and the second plate portion vertically deviate from each other, the first plate portion has a top surface, a bottom section, and a bottom end, the second plate portion has a top surface, a top section, and a top end, and the top surface of the first plate portion is higher it than the top surface of the second plate portion;
the insertion portion of the slider is formed between the bottom section of the first plate portion and the top section of the second plate portion, and has
two side walls disposed at two sides of the through slot, each one of the two side walls connected to the first plate portion and the second plate portion and having an outer surface; and
two slide slots respectively formed on the outer surfaces of the two side walls, each one of the two slide slots located between the first plate portion and the second plate portion, wherein two longitudinal side portions of the body are respectively inserted into the two slide slots;

the through slot is sloped from the top end of the second plate portion toward the bottom end of the first plate portion and is located between the two side walls;

the cover has a top stop portion formed on the back surface of the covering base; and each one of the two covering side plates having a top surface;

a bottom surface;

an inner surface;

a guiding groove formed on the inner surface of the covering side plate, extending to the top surface of the covering side plate, and having a bottom; and a bottom wall formed on the bottom surface of the covering side plate and located at the bottom of the guiding groove;

wherein two sides of the body of the frame are moveably inserted into the guiding grooves of the two covering side plates, and the top stop portion is located above the top surfaces of the two covering side plates.

43. The webbing height adjustment device as claimed in claim 31, wherein the first plate portion of the slider and the second plate portion vertically deviate from each other, the first plate portion has a top surface, a bottom section, and a bottom end, the second plate portion has a top surface, a top section, and a top end, and the top surface of the first plate portion is higher than the top surface of the second plate portion;

the insertion portion of the slider is formed between the bottom section of the first plate portion and the top section of the second plate portion, and has two side walls disposed at two sides of the through slot, each one of the two side walls connected to the first plate portion and the second plate portion and having an outer surface; and two slide slots respectively formed on the outer surfaces of the two side walls, each one of the two slide slots located between the first plate portion and the second plate portion, wherein two longitudinal side portions of the body are respectively inserted into the two slide slots;

the through slot is sloped from the top end of the second plate portion toward the bottom end of the first plate portion and is located between the two side walls;

the cover has a top stop portion formed on the back surface of the covering base; and each one of the two covering side plates having a top surface;

a bottom surface;

an inner surface;

a guiding groove formed on the inner surface of the covering side plate, extending to the top surface of the covering side plate, and having a bottom; and a bottom wall formed on the bottom surface of the covering side plate and located at the bottom of the guiding groove; and wherein two sides of the body of the frame are moveably inserted into the guiding grooves of the two covering side plates, and the top stop portion is located above the top surfaces of the two covering side plates.

44. The webbing height adjustment device as claimed in claim 32, wherein the first plate portion of the slider and the second plate portion vertically deviate from each other, the first plate portion has a top surface, a bottom section, and a bottom end, the second plate portion has a top surface, a top section, and a top end, and the top surface of the first plate portion is higher than the top surface of the second plate portion;

the insertion portion of the slider is formed between the bottom section of the first plate portion and the top section of the second plate portion, and has two side walls disposed at two sides of the through slot, each one of the two side walls connected to the first plate portion and the second plate portion and having an outer surface; and two slide slots respectively formed on the outer surfaces of the two side walls, each one of the two slide slots located between the first plate portion and the second plate portion, wherein two longitudinal side portions of the body are respectively inserted into the two slide slots;

the through slot is sloped from the top end of the second plate portion toward the bottom end of the first plate portion and is located between the two side walls;

the cover has a top stop portion formed on the back surface of the covering base; and each one of the two covering side plates having a top surface;

a bottom surface;

an inner surface;

a guiding groove formed on the inner surface of the covering side plate, extending to the top surface of the covering side plate, and having a bottom; and a bottom wall formed on the bottom surface of the covering side plate and located at the bottom of the guiding groove;

wherein two sides of the body of the frame are moveably inserted into the guiding grooves of the two covering side plates, and the top stop portion is located above the top surfaces of the two covering side plates.

45. The webbing height adjustment device as claimed in claim 33, wherein the first plate portion of the slider and the second plate portion vertically deviate from each other, the first plate portion has a top surface, a bottom section, and a bottom end, the second plate portion has a top surface, a top section, and a top end, and the top surface of the first plate portion is higher than the top surface of the second plate portion;

the insertion portion of the slider is formed between the bottom section of the first plate portion and the top section of the second plate portion, and has two side walls disposed at two sides of the through slot, each one of the two side walls connected to the first plate portion and the second plate portion and having an outer surface; and two slide slots respectively formed on the outer surfaces of the two side walls, each one of the two slide slots located between the first plate portion and the second plate portion, wherein two longitudinal side portions of the body are respectively inserted into the two slide slots;

the through slot is sloped from the top end of the second plate portion toward the bottom end of the first plate portion and is located between the two side walls;

the cover has
a top stop portion formed on the back surface of the covering base; and
each one of the two covering side plates having
a top surface;
a bottom surface;
an inner surface;
a guiding groove formed on the inner surface of the covering side plate, extending to the top surface of the covering side plate, and having a bottom; and
a bottom wall formed on the bottom surface of the covering side plate and located at the bottom of the guiding groove;
wherein two sides of the body of the frame are moveably inserted into the guiding grooves of the two covering side plates, and the top stop portion is located above the top surfaces of the two covering side plates.

46. The webbing height adjustment device as claimed in claim 34, wherein
the first plate portion of the slider and the second plate portion vertically deviate from each other, the first plate portion has a top surface, a bottom section, and a bottom end, the second plate portion has a top surface, a top section, and a top end, and the top surface of the first plate portion is higher than the top surface of the second plate portion;
the insertion portion of the slider is formed between the bottom section of the first plate portion and the top section of the second plate portion, and has
two side walls disposed at two sides of the through slot, each one of the two side walls connected to the first plate portion and the second plate portion and having an outer surface; and
two slide slots respectively formed on the outer surfaces of the two side walls, each one of the two slide slots located between the first plate portion and the second plate portion, wherein two longitudinal side portions of the body are respectively inserted into the two slide slots;
the through slot is sloped from the top end of the second plate portion toward the bottom end of the first plate portion and is located between the two side walls;
the cover has
a top stop portion formed on the back surface of the covering base; and
each one of the two covering side plates having
a top surface;
a bottom surface;
an inner surface;
a guiding groove formed on the inner surface of the covering side plate, extending to the top surface of the covering side plate, and having a bottom; and
a bottom wall formed on the bottom surface of the covering side plate and located at the bottom of the guiding groove;
wherein two sides of the body of the frame are moveably inserted into the guiding grooves of the two covering side plates, and the top stop portion is located above the top surfaces of the two covering side plates.

47. The webbing height adjustment device as claimed in claim 41, wherein the connecting portion of the frame is connected to a connecting strap, the connecting strap is connected to a connecting element, and the webbing passes through the connecting element.

48. The webbing height adjustment device as claimed in claim 42, wherein the connecting portion of the frame is connected to a connecting strap, the connecting strap is connected to a connecting element, and the webbing passes through the connecting element.

49. The webbing height adjustment device as claimed in claim 43, wherein the connecting portion of the frame is connected to a connecting strap, the connecting strap is connected to a connecting element, and the webbing passes through the connecting element.

50. The webbing height adjustment device as claimed in claim 44, wherein the connecting portion of the frame is connected to a connecting strap, the connecting strap is connected to a connecting element, and the webbing passes through the connecting element.

51. The webbing height adjustment device as claimed in claim 45, wherein the connecting portion of the frame is connected to a connecting strap, the connecting strap is connected to a connecting element, and the webbing passes through the connecting element.

52. The webbing height adjustment device as claimed in claim 46, wherein the connecting portion of the frame is connected to a connecting strap, the connecting strap is connected to a connecting element, and the webbing passes through the connecting element.

* * * * *